US012686149B2

(12) United States Patent  (10) Patent No.:   US 12,686,149 B2
Hemphill et al.  (45) Date of Patent:   *Jul. 21, 2026

(54) METHOD AND APPARATUS FOR MAKING A GYPSUM BOARD

(71) Applicant: KNAUF GIPS KG, Iphofen (DE)

(72) Inventors: Mark K. Hemphill, Hawthorn Woods, IL (US); Annamaria Vilinska, Chicago, IL (US); Yijun Sang, Oak Park, IL (US); Sooraj Kumar Ambadi Omanakuttan Nair, Evanston, IL (US)

(73) Assignee: KNAUF GIPS KG, Iphofen (DE)

( * ) Notice: Subject to any disclaimer, the term of this patent is extended or adjusted under 35 U.S.C. 154(b) by 175 days.

This patent is subject to a terminal disclaimer.

(21) Appl. No.: 18/625,705

(22) Filed: Apr. 3, 2024

(65) Prior Publication Data

US 2025/0018601 A1     Jan. 16, 2025

Related U.S. Application Data

(60) Provisional application No. 63/512,778, filed on Jul. 10, 2023.

(51) Int. Cl.
B28B 19/00       (2006.01)
C04B 11/00       (2006.01)
C04B 111/00      (2006.01)

(52) U.S. Cl.
CPC .......... B28B 19/0092 (2013.01); C04B 11/00 (2013.01); *C04B 2111/00629* (2013.01)

(58) Field of Classification Search
CPC ................................................ B28B 19/0092
See application file for complete search history.

(56) References Cited

U.S. PATENT DOCUMENTS 1,932,956  A     10/1933   Crandell
2,078,199  A      4/1937   King
(Continued)

FOREIGN PATENT DOCUMENTS

CN      203947627  U      11/2014
CN      104589466  A       5/2015
(Continued)

OTHER PUBLICATIONS

International Search Report and Written Opinion of the International Searching Authority mailed Oct. 2, 2024 to United States Gypsum Company for International Application No. PCT/US2024/036651 filed Jul. 3, 2024.
(Continued)

*Primary Examiner* — Philip C Tucker
*Assistant Examiner* — John Blades
(74) *Attorney, Agent, or Firm* — Vorys, Sater, Seymour and Pease LLP; Pradip Sahu; Maryellen Feehery Hank

(57) ABSTRACT

A method and apparatus to manufacture gypsum board that directs an aqueous gypsum slurry to a second cover sheet, and passes the second cover sheet over a roller spaced above a first cover sheet so that a majority of the aqueous gypsum slurry of falls off the second cover sheet to deposit over the first cover sheet. Another aqueous gypsum slurry of a different density than the deposited slurry is applied over the first cover sheet before and/or after the deposited slurry. A gypsum board having layers of different densities is made by the method and apparatus.

18 Claims, 3 Drawing Sheets

(56) References Cited

U.S. PATENT DOCUMENTS

| | | | |
|---|---|---|---|
| 3,573,947 | A | 4/1971 | Kinkade et al. |
| 4,288,263 | A | 9/1981 | Delcoigne et al. |
| 5,643,510 | A | 7/1997 | Sucech |
| 5,683,635 | A | 11/1997 | Sucech et al. |
| 5,714,032 | A * | 2/1998 | Ainsley ............... B28B 19/0015 |
| | | | 366/15 |
| 5,908,521 | A | 6/1999 | Ainsley et al. |
| 6,342,284 | B1 | 1/2002 | Yu et al. |
| 6,409,825 | B1 | 6/2002 | Yu et al. |
| 6,494,609 | B1 | 12/2002 | Wittbold et al. |
| 6,632,550 | B1 | 10/2003 | Yu et al. |
| 6,815,049 | B2 | 11/2004 | Veeramasuneni et al. |
| 6,822,033 | B2 | 11/2004 | Yu et al. |
| 6,874,930 | B2 | 4/2005 | Wittbold et al. |
| 6,878,321 | B2 | 4/2005 | Hauber et al. |
| 6,986,812 | B2 | 1/2006 | Dubey et al. |
| 7,007,914 | B2 | 3/2006 | Petersen et al. |
| 7,296,919 | B2 | 11/2007 | Petersen et al. |
| 8,323,785 | B2 | 12/2012 | Yu et al. |
| 8,770,139 | B2 | 7/2014 | Frank et al. |
| 9,616,591 | B2 | 4/2017 | Li et al. |
| 9,909,718 | B2 | 3/2018 | Wittbold et al. |
| 9,999,989 | B2 | 6/2018 | Rago et al. |
| 10,052,753 | B2 | 8/2018 | Ni et al. |
| 10,076,853 | B2 | 9/2018 | Wittbold et al. |
| 10,239,230 | B2 | 3/2019 | Li et al. |
| 10,286,572 | B2 | 5/2019 | Li et al. |
| 10,421,250 | B2 | 9/2019 | Li et al. |
| 10,946,549 | B2 | 3/2021 | Karakoussis et al. |
| 11,186,066 | B2 | 11/2021 | Hemphill et al. |
| 2004/0134585 | A1 | 7/2004 | Callais et al. |
| 2012/0207989 | A1 | 8/2012 | Xu et al. |
| 2013/0098268 | A1 | 4/2013 | Li et al. |
| 2017/0106568 | A1 | 4/2017 | Keating et al. |
| 2021/0129490 | A1 | 5/2021 | Li et al. |
| 2021/0198148 | A1 | 7/2021 | Li et al. |
| 2021/0309571 | A1 | 10/2021 | Whittington et al. |
| 2024/0033972 | A1 | 2/2024 | Ambadi Omanakuttan Nair et al. |

FOREIGN PATENT DOCUMENTS

| | | | |
|---|---|---|---|
| CN | 206048906 | U | 3/2017 |
| CN | 114876204 | A | 8/2022 |
| DE | 102007063561 | A1 | 7/2009 |
| EP | 3152022 | B1 | 8/2021 |
| JP | 2019147387 | A | 9/2019 |
| WO | 2012092582 | A1 | 7/2012 |
| WO | 2015185143 | A1 | 12/2015 |
| WO | 2015185251 | A1 | 12/2015 |
| WO | 2022135734 | A1 | 6/2022 |

OTHER PUBLICATIONS

International Preliminary Report on Patentability issued Jan. 9, 2026 to Knauf GIPS KG for International Application No. PCT/US2024/036651 filed Jul. 3, 2024.

* cited by examiner

METHOD AND APPARATUS FOR MAKING A GYPSUM BOARD

FIELD OF THE INVENTION

The present disclosure relates to methods for manufacturing gypsum boards with variation in density and, more particularly, to methods and apparatus for distribution of an aqueous gypsum slurry for making gypsum boards with variation in density.

BACKGROUND OF THE INVENTION

In the construction of buildings, one of the most common building elements is gypsum boards, also known as gypsum paneling, gypsum building panels, gypsum panels, or wallboard, used in the construction of walls and/or ceilings. Walls made from gypsum wallboard are traditionally constructed by affixing the panels to wood studs or metal framing, and treating the joints between adjoining panels with a specially prepared adhesive called a joint compound.

The gypsum board is primarily made of gypsum as opposed to cement boards which are primarily a cement, such as Portland cement. In particular, gypsum boards are primarily composed of calcium sulfate dihydrate. The gypsum boards are made by reacting water and stucco (also known as calcined gypsum) such that calcium sulfate hemihydrate sets to form calcium sulfate dihydrate (gypsum). Stucco is made by calcining gypsum, and it is typically comprised primarily of calcium sulfate hemihydrate and can also contain calcium sulfate anhydrite. The calcium sulfate hemihydrate is produced by calcination of calcium sulfate dihydrate to partially dehydrate the calcium sulfate dihydrate. When stucco is mixed with water, calcium sulfate hemihydrate particles react, rehydrating to become set gypsum.

It is well-known to produce the gypsum board by uniformly dispersing the calcined gypsum (stucco) in water to form an aqueous gypsum slurry (e.g., a mixture containing stucco and water). For purposes of this description the aqueous slurry that initially contains calcined gypsum which then sets to form gypsum is termed a gypsum slurry. The aqueous gypsum slurry is typically produced in a continuous manner by inserting stucco and water and optional other additives into a mixer which contains means for agitating the contents to form a uniform gypsum slurry. The additives may include, for example, retarders, accelerators, foaming agents, wet strength enhancing materials, biocides, sag resistant ingredients, cellulosic fibers, glass fibers, fire retarding materials, binders, water repellency ingredients, dust mitigators, starches, as well as other ingredients or enhancing materials that are known in the art.

The slurry is continuously directed towards and through a discharge outlet of the mixer and into a discharge conduit connected to the discharge outlet of the mixer. To reduce the overall weight of the finished gypsum board, air may be incorporated as bubbles or air pockets into the aqueous gypsum slurry resulting in a gypsum board having a foamed or bubbled gypsum core having air voids (also called air bubbles). For example, to provide the air, an aqueous foam can be combined with the aqueous gypsum slurry in the mixer and/or in the discharge conduit. The stream of slurry passes through the discharge conduit from which it is continuously deposited onto a moving web of cover sheet material, such as facer sheet of paper or fibrous mat, supported by a forming table. The slurry is allowed to spread over the advancing web.

A second web of cover sheet material, typically another facer sheet of paper or fibrous mat, is applied to cover the slurry and form a multi-layer structure of a continuous wallboard preform, such that the aqueous gypsum slurry, that will form the gypsum core, is between the two facing materials. The wallboard preform is subjected to forming, such as at a conventional forming station, to obtain a desired thickness. The calcined gypsum reacts with the water in the wallboard preform and sets (e.g., to form an interlocking matrix of calcium sulfate dihydrate, referred to as set gypsum) as the wallboard preform moves down a manufacturing line. The wallboard preform is cut into segments at a point along the line where the wallboard preform has set sufficiently, the segments are flipped over, dried (e.g., in a kiln) to drive off excess water, and processed to provide the final wallboard product of desired dimensions. The produced gypsum board may be further processed, as is known in the art, and then bundled, and made ready for shipment.

U.S. Pat. No. 10,421,250 to Li et al discloses a composite board comprising a board core and a concentrated layer of substantial thickness. The concentrated layer has a higher density than the board core.

US 2012/0207989 to Xu et al discloses multilayered core cementitious boards with increased nail-pull resistance. The boards can include two or more layers of cementitious compositions, wherein each layer may be of a different density.

Prior devices and methods for addressing some of the operational problems associated with the production of gypsum wallboard are disclosed in U.S. Pat. Nos. 5,683,635; 5,643,510; 6,494,609; 6,874,930; 7,007,914; and 7,296,919; 9,999,989 to Rago et al., 10,076,853 to Wittbold et al.; 9,909,718 to Wittbold et al.; 10,286,572 to Li et al.; 10,052,753 to Li et al.; U.S. Pat. Nos. 10,239,230 to Li et al.; 9,616,591 to Li et al. Other prior devices and methods for addressing some of the operational problems associated with the production of gypsum wallboard are disclosed in WO2015185251-A1 to Martin et al and WO2015185143-A1 to Martin et al.

A conventional manufacturing line directs the core slurry (through a hose towards a densified layer on the face paper. This process may remove some of densified layer on the face paper at the point of impact. For purposes of this specification, such removal is termed washout.

SUMMARY OF THE INVENTION

The present invention provides a gypsum board comprising:
- a front first cover sheet and a back second cover sheet on opposed sides of the gypsum board, the front first cover sheet having first and second opposed surfaces, and the back second cover sheet having third and fourth opposed surfaces;
- optionally a first board layer comprising gypsum comprising calcium sulfate dihydrate contacting the front first cover sheet, wherein the first board layer has a first board layer density of 45-55 lbs/ft3,
- a second board layer comprising gypsum comprising calcium sulfate dihydrate, wherein the second board layer has a second board layer density of 33-43 lbs/ft3, if the first board layer is present then the second board layer density is lower than the first board layer density, and
- a third board layer comprising gypsum comprising calcium sulfate dihydrate, wherein the third board layer has a third board layer density of 22-30 lbs/ft3 which is lower than the second board layer density, wherein the first board layer if present, the second board layer and the third board layer are between the front first cover sheet and the back second cover sheet, wherein opposed sides of the first board layer, if the first board layer is present respectively, contact the second board layer and the first surface of the front first cover sheet, wherein opposed sides of the second board layer respectively contact the first board layer if present and the third board layer, wherein if the first board layer is not present then opposed sides of the second board layer respectively contact the front first cover sheet and the third board layer, wherein opposed sides of the third board layer respectively contact the second board layer and the third surface of the back second cover sheet;

wherein the first board layer if present, the second board layer and the third board layer comprise at least 60 wt. %, preferably at least 70 wt. %, more preferably at least 80 wt. %, furthermore preferably at least 90 wt. %, or most preferably at least 95 wt. % typically 60 to 98 wt. %, calcium sulfate dihydrate.

The typical ranges for the dry densities of each of the layers are as follows:

The first board layer 22 if present, having the highest density layer has a density of 45-55 lbs/ft3, typically 50-52 lbs/ft3.

The second board layer 23, middle density layer has a density of 33-43 lbs/ft3, typically 38-40 lbs/ft3.

The third board layer 12, lowest density layer has a density of 22-30 lbs/ft3, typically 25-27 lbs/ft3.

The present invention provides a method to manufacture the gypsum board comprising:

depositing a front first cover sheet, having first and second opposed surfaces, over a forming surface and moving the front first cover sheet horizontally in a machine direction along the forming surface;

optionally depositing a first aqueous gypsum slurry on the front first cover sheet moving in the machine direction to form a first aqueous gypsum slurry layer as a higher-density region in layer form contacting an upper surface of the front first cover sheet, wherein the first aqueous gypsum slurry layer has a first slurry density of 75-100 lbs/ft3;

depositing a second aqueous gypsum slurry in a foamed state on the first aqueous gypsum slurry layer, if the first aqueous gypsum slurry layer is present, or if the first aqueous gypsum slurry layer is not present depositing the second aqueous gypsum slurry in a foamed state on the front first cover sheet, to form a second aqueous gypsum slurry layer as a middle-density region in layer form contacting an upper surface of the first aqueous gypsum slurry layer, if the first aqueous gypsum slurry layer is present, or if the first aqueous gypsum slurry layer is not present contacting an upper surface of the front first cover sheet, wherein the second aqueous gypsum slurry layer has a second slurry density of 40-65 lbs/ft3, wherein if the first aqueous gypsum slurry is present the second slurry density is lower than the first slurry density, and depositing a third aqueous gypsum slurry in a foamed state on the second aqueous gypsum slurry layer to form a third aqueous gypsum slurry layer as a lower-density region in layer form contacting an upper surface of the second aqueous gypsum slurry layer, wherein the third aqueous gypsum slurry layer has a third slurry density of 30-55 lbs/ft3 which is lower than the second aqueous slurry density;

wherein the optional first aqueous gypsum slurry, the second aqueous gypsum slurry and the third aqueous gypsum slurry comprise a respective mixture of water and stucco, wherein the stucco comprises calcium sulfate hemihydrate, wherein the optional first aqueous gypsum slurry, the second aqueous gypsum slurry and the third aqueous gypsum slurry each comprises a respective mixture of at least 60 wt. %, preferably at least 70 wt. %, more preferably at least 80 wt. %, furthermore preferably at least 90 wt. %, or most preferably at least 95 wt. %, typically 60 to 98 wt. % said calcium sulfate hemihydrate on a dry (water free) basis, and the water at a weight ratio of water to the calcium sulfate hemihydrate of 0.2:1 to 1.2:1;

passing a back second cover sheet, having third and fourth opposed surfaces, over a first transition roller spaced above the front first cover sheet, and subsequently applying the back second cover sheet over the third aqueous gypsum slurry layer, to form a multilayer assembly including the front first cover sheet, optionally the first aqueous gypsum slurry layer on the first cover sheet, the second aqueous gypsum slurry layer on the first layer, if the first layer is present, or if the first layer is not present then the second layer is on the first cover sheet, the third aqueous gypsum slurry layer on the second aqueous gypsum slurry layer, and the back second cover sheet over the third aqueous gypsum slurry layer, with the third surface of the second back cover sheet facing the third aqueous gypsum slurry layer, preferably the third aqueous gypsum slurry layer contacting the second aqueous gypsum slurry layer;

passing the multilayer assembly into a forming station for forming the multilayer assembly, wherein preferably the multilayer assembly passes under a forming plate of the forming station;

setting the calcium sulfate hemihydrate respectively of the optional first aqueous gypsum slurry layer, the second aqueous gypsum slurry layer, and the third aqueous gypsum slurry layer by respectively reacting the calcium sulfate hemihydrate with the water of the optional first aqueous gypsum slurry layer, the second aqueous gypsum slurry layer, and the third aqueous gypsum slurry layer to form a panel comprising a gypsum core of an optional first board layer comprising calcium sulfate dihydrate, a second board layer comprising calcium sulfate dihydrate, and a third board layer comprising calcium sulfate dihydrate between the front first cover sheet and back second cover sheet, wherein the first board layer, if present, has a first board layer density, wherein the second board layer has a second board layer density, wherein if the first board layer is present the second board layer density is lower than the first board layer density, and wherein the third board layer has a third board layer density lower than the second board layer density; and cutting and drying the panel into the gypsum board; and wherein the method comprises:

A) said depositing of the third aqueous gypsum slurry to comprise directing the third aqueous gypsum slurry on the third surface of the back second cover sheet, passing the back second cover sheet with the third aqueous gypsum slurry over the first transition roller spaced above the first front cover sheet, while the fourth surface of the back second cover sheet contacts the first transition roller, so that a majority of the third aqueous gypsum slurry falls off the back second cover sheet onto the second aqueous gypsum slurry over the front first cover sheet; or B) said depositing of the second aqueous gypsum slurry to comprise directing the second aqueous gypsum slurry on the third surface of the back second cover sheet, passing the back second cover sheet with the second aqueous gypsum slurry over the first transition roller spaced above the front first cover sheet, while the fourth surface of the back second cover sheet contacts the first transition roller, so that a majority of the second aqueous gypsum slurry falls off the back second cover sheet onto the deposited first aqueous gypsum slurry if present or, if the first aqueous gypsum slurry is not present, onto the front first cover sheet, and then depositing the third aqueous gypsum slurry onto the deposited second aqueous gypsum slurry.

The typical ranges for the dry densities of each of the layers of the manufactured board are as follows:

The first board layer 22 if present, having the highest density layer has a density of 45-55 lbs/ft3, typically 50-52 lbs/ft3.

The second board layer 23, middle density layer has a density of 33-43 lbs/ft3, typically 38-40 lbs/ft3.

The third board layer 12, lowest density layer has a density of 22-30 lbs/ft3, typically 25-27 lbs/ft3.

The present invention also provides an apparatus to perform the method to manufacture gypsum board comprising:

a forming surface for depositing thereon a front first cover sheet, having first and second opposed surfaces, and moving the front first cover sheet horizontally in a machine direction along the forming surface;

optionally a source of a first aqueous gypsum slurry for depositing the first aqueous gypsum slurry on the front first cover sheet moving in the machine direction to form a first aqueous gypsum slurry layer as a higher-density region in layer form contacting an upper surface of the front cover sheet, wherein the first aqueous gypsum slurry layer has a first slurry density of 75-100 lbs/ft3, a source of a second aqueous gypsum slurry in a foamed state for depositing the second aqueous gypsum slurry on the first aqueous gypsum slurry layer if present, of if the first aqueous gypsum slurry is not present then on the front first cover sheet, to form a second aqueous gypsum slurry layer as a middle-density region in layer form contacting an upper surface of the first aqueous gypsum slurry layer, wherein the second aqueous gypsum slurry layer has a second slurry density of 40-65 lbs/ft3, wherein if the first aqueous gypsum slurry is present the second slurry density is lower than the first slurry density, a source of a third aqueous gypsum slurry in a foamed state for depositing the third aqueous gypsum slurry on the second aqueous gypsum slurry layer to form a third aqueous gypsum slurry layer as a lower-density region in layer form contacting an upper surface of the second aqueous gypsum slurry layer, wherein the third aqueous gypsum slurry layer has a third slurry density of 30-55 lbs/ft3 which is lower than the second slurry density, wherein the optional first aqueous gypsum slurry, the second aqueous gypsum slurry and the third aqueous gypsum slurry comprise a respective mixture of water and stucco, wherein the stucco comprises calcium sulfate hemihydrate, wherein the optional first aqueous gypsum slurry, the second aqueous gypsum slurry and the third aqueous gypsum slurry respectively comprise a mixture of at least 60 wt. %, preferably at least 70 wt. %, more preferably at least 80 wt. %, furthermore preferably at least 90 wt. %, or most preferably at least 95 wt. %, typically 60 to 98 wt. % said calcium sulfate hemihydrate on a dry (water free) basis, and the water at a weight ratio of water to the calcium sulfate hemihydrate of 0.2:1 to 1.2:1; and a back second cover sheet drive comprising a first transition roller spaced above the front first cover sheet for moving a back second cover sheet, having third and fourth opposed surfaces, along a back second cover sheet path and subsequently applying the back second cover sheet over the third aqueous gypsum slurry layer to form a multilayer assembly including the front first cover sheet, optionally the first aqueous gypsum slurry layer on the first cover sheet, the second aqueous gypsum slurry layer on the first aqueous gypsum slurry layer if present, or on the front first cover sheet if the first aqueous gypsum slurry layer is not present, the third aqueous gypsum slurry layer on the second aqueous gypsum slurry layer, and the back second cover sheet over the third aqueous gypsum slurry layer, with the third surface of the back second cover sheet facing the third aqueous gypsum slurry layer;

a forming station for forming the multilayer assembly, wherein preferably the forming station comprises a forming plate for passing the multilayer assembly under the forming plate of the forming station; and a location for respectively setting the calcium sulfate hemihydrate of the optional first aqueous gypsum slurry layer, the second aqueous gypsum slurry layer, and the third aqueous gypsum slurry layer by respectively reacting the calcium sulfate hemihydrate with the water of the optional first aqueous gypsum slurry layer, the second aqueous gypsum slurry layer, and the third aqueous gypsum slurry layer to form a panel comprising a gypsum core respectively of an optional first board layer comprising calcium sulfate dihydrate, a second board layer comprising calcium sulfate dihydrate, and a third board layer comprising calcium sulfate dihydrate between the front first cover sheet and back second cover sheet;

wherein the first board layer, if present, has a first board layer density, wherein the second board layer has a second board layer density, wherein if the first board layer is present the second board layer density is lower than the first board layer density, and wherein the third board layer has a third board layer density lower than the second board layer density; and a cutting station for cutting the panel into the gypsum board;

a drying station for drying the gypsum board; and wherein the apparatus comprises:

A) said source of the third aqueous gypsum slurry in the foamed state for depositing of the third aqueous gypsum slurry by directing the third aqueous gypsum slurry on the third surface of the back second cover sheet, adapting and configuring the first transition roller for passing the back second cover sheet with the third aqueous gypsum slurry over the first transition roller spaced above the first front cover sheet, while the fourth surface of the back second cover sheet contacts the first transition roller, so that a majority of the third portion aqueous gypsum slurry falls off the back second cover sheet onto the second portion of aqueous gypsum slurry on the front first cover sheet; or B) said source of the second aqueous gypsum slurry in the foamed state adapted and configured for depositing of the second aqueous gypsum slurry by directing the second aqueous gypsum slurry on the third surface of the back second cover sheet, adapting and configuring the first transition roller for passing the back second cover sheet with the second aqueous gypsum slurry over the first transition roller spaced above the first cover sheet, while the fourth surface of the back second cover sheet contacts the first transition roller, so that a majority of the second portion aqueous gypsum slurry falls off the back second cover sheet onto the deposited first portion of aqueous gypsum slurry if present, or onto the front first cover sheet if the first portion of aqueous gypsum slurry is not present, and said source of the third aqueous gypsum slurry in the foamed state adapted and configured for depositing the third aqueous gypsum slurry in the foamed state onto the deposited second aqueous gypsum slurry.

Typically the method and apparatus move the back second cover sheet along a back second cover sheet path comprising a first path segment and a second path segment. The first path segment is adapted and configured for moving the back second cover sheet to the first transition roller, above the layer of aqueous gypsum slurry on the front first cover sheet deposited from the first transition roller, with movement comprising a first horizontal movement component and an optional first vertical movement component. The first horizontal movement component being movement in a direction opposite to the machine direction. The first vertical movement component being movement towards the first transition roller in a neutral direction, to provide movement only along the first horizontal movement component, or in a downwards direction. The first vertical movement component and the first horizontal movement component may both simultaneously present along all or a same portion of the first segment. This moves the back second cover sheet along a slope defining an angle of incidence, relative to the first cover sheet traveling on the forming surface below the first transition roller, in a range having a minimum of 0, 5, 10, 15, or 20 degrees and a maximum of 20, 30, 45, or 60 degrees (see FIGS. 3 and 4). The minimum is equal to or less than the maximum, for example, a suitable range has a minimum of 20 and a maximum of 30 degrees.

The method or apparatus discharges the foamed second aqueous gypsum slurry or the foamed third aqueous gypsum slurry in a direction of concurrent flow with the direction of movement of the back second cover sheet to contact the third surface of the back second cover sheet in the first path segment. This contact is at an angle of incidence "B" in a range of 0 to 90 degrees, typically having a minimum of 0, 5, 10 or 15 degrees and a maximum of 5, 10, 15, 30, 45 or 60 degrees, wherein the minimum is equal to or less than the maximum, for example 0 to 5 degrees, or 5 to 20 degrees, relative to the third surface of the back second cover sheet. The angle of incidence "B" is the angle between the discharged foamed aqueous gypsum slurry and the back second cover sheet. The angle of incidence "B" is at most perpendicular but typically acute.

At a downstream end of the first path segment the back second cover sheet passes around the first transition roller to feed the back second cover sheet to the second path segment, wherein the second path segment has an upstream end and a downstream end, the upstream end at the first transition roller. The back second cover sheet moves above the slurry deposited by the first transition roller along the second path segment from the first transition roller to the forming station. The second path segment movement comprising a second horizontal movement component in the machine direction ("T"). The method and apparatus then apply the third surface of the second cover sheet over, typically directly on, the deposited third aqueous gypsum slurry layer.

The first transition roller is spaced a distance above the high-density region on the front first cover sheet, that is at least the combined thickness of the first, second and third layers of aqueous gypsum slurry. Typically 6 to 60 inches above the combined thickness of the first, second and third layers of aqueous gypsum slurry.

The passing of the second or third aqueous gypsum slurry over the first transition roller deposits a majority by weight of the second or third aqueous gypsum slurry over the front first cover sheet, wherein typically as this deposition occurs a remainder of the second or third aqueous gypsum slurry remains in contact with the back second cover sheet as the back second cover sheet moves into the second path segment.

The first transition roller changes the direction of movement of the back second cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the front first cover sheet. This movement is above the layer of aqueous gypsum slurry on the front first cover sheet deposited from the first transition roller.

Preferably the back second cover sheet drive comprises the first transition roller and a second transition roller for moving the back second cover sheet along a back second cover sheet path comprising the first path segment and the second path segment. Typically the second path segment has a first portion and a second portion, wherein at a downstream end of the first portion of the second path segment the back second cover sheet passes over the second transition roller to change the direction of movement of the back second cover sheet and feed the back second cover sheet to the second portion of the second path segment that feeds the forming station.

At the downstream end of the second path segment the method comprises:

depositing the back second cover sheet over, typically on, the third aqueous gypsum slurry layer to form the multilayer assembly including the front first cover sheet, the first aqueous gypsum slurry layer on the first cover sheet, the second aqueous gypsum slurry layer on the first layer, the third aqueous gypsum slurry layer on the second aqueous gypsum slurry layer, and the back second cover sheet over, typically on, the third aqueous gypsum slurry layer.

The first aqueous gypsum slurry, typically in an unfoamed state, forms a higher-density region in layer form contacting the front first cover sheet.

The second aqueous gypsum slurry in a foamed state forms a middle-density region in layer form contacting the high-density region, the higher-density region having a higher density than the middle-density region.

The third aqueous gypsum slurry in a foamed state forms a lower-density region in layer form contacting the middle-density region, the middle-density region having a higher density than the lower-density region.

The board core comprises a set middle-density region comprising calcium sulfate dihydrate in layer form, and a set lower-density region comprising calcium sulfate dihydrate in layer form, and optionally a set higher-density region comprising calcium sulfate dihydrate in layer form. The set higher-density region, if present, being interposed as a layer between the set middle-density region and the front first cover sheet. The set middle-density region being interposed as a layer between the set higher-density region if present, and the lower-density region, or if the set higher density layer is not present then the set middle-density region being interposed as a layer between the front first paper cover sheet and the lower-density region. The set lower-density region being interposed as a layer between the set middle-density region and the back second cover sheet.

The present invention also provides a gypsum board made according to the method or by the apparatus of the present invention.

BRIEF DESCRIPTION OF THE DRAWINGS

Like reference numerals in the figures indicate like elements unless otherwise indicated.

DETAILED DESCRIPTION OF THE INVENTION

The present invention comprises methods and apparatus that orient a back paper drive to direct core slurry deposition and distribution on the back paper cover sheet, and subsequently drop from the back paper onto at least one denser layer on a face paper cover sheet in a gypsum board manufacturing line to form a core layer, and then apply the back paper cover sheet over the core layer.

The initial plane of contact of the core-slurry with the back paper cover sheet, rather than the denser layer slurry on the face paper cover sheet, avoids the significant contact forces and hydraulic jump that may occur if the core-slurry was directly applied from the mixer onto the denser layer.

The proposed invention helps increase nail pull of the board by having a core comprising two relatively thick layers with the layer closer to the face paper cover sheet being denser than the layer further from the face paper cover sheet. This helps to lower the basis weight of manila paper typically used for face paper cover sheet. Optionally there is also a layer thinner and denser than either of the two relatively thick layers in contact with the face paper cover sheet to be between the face paper cover sheet and the two relatively thicker core layers.

One of skill in the art would be able to modify the methods described herein to produce interior wallboard having a gypsum core between paper facer sheets, exterior sheathing gypsum panels, gypsum tile backer board, or other gypsum building panels. For example, a typical gypsum exterior sheathing panel for processing according to the invention may comprise, from front to back, a first fibrous mat, a gypsum core layer having front and rear surfaces, the gypsum core layer having a thickness of about 0.25 inches to about 1.25 inches, preferably about 0.25 inches to about 1 inch, wherein the first fibrous mat is attached as a facer cover sheet to the front surface of the gypsum core layer, and a second fibrous mat is attached as a backer cover sheet to the rear surface of the gypsum core layer. The gypsum core layer comprises more than about 50 wt. % calcium sulfate dihydrate, preferably at least about 75 wt. %, more preferably at least about 85 wt. %. The first fibrous mat and second fibrous mat may comprise paper or fibrous material (e.g., one or more of polymer fibers, glass fibers, and mineral fibers).

In the present specification, all weight percent values unless otherwise indicated are in weight percent. As used herein, "total dry weight" or "on a dry weight basis" refers to the weight of a mixture excluding any water component that may be present. "Water component" excludes the water that may be present in a gypsum crystal structure. In contrast, a "wet basis" includes water in the wt. % calculation.

Gypsum Board

A gypsum board is a gypsum product having a board shape (i.e., being in particular, at least substantially flat). The gypsum board typically has a rectangular shape.

Figure 1:
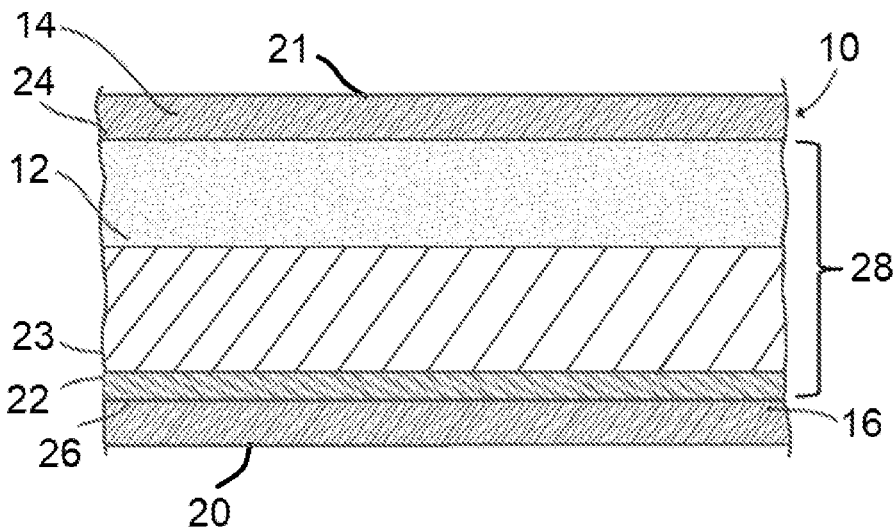
FIG. 1 shows a cross-sectional view of a gypsum board of the invention, in which a board core (gypsum core) is between a front cover sheet and a back cover sheet.
Figure 2:
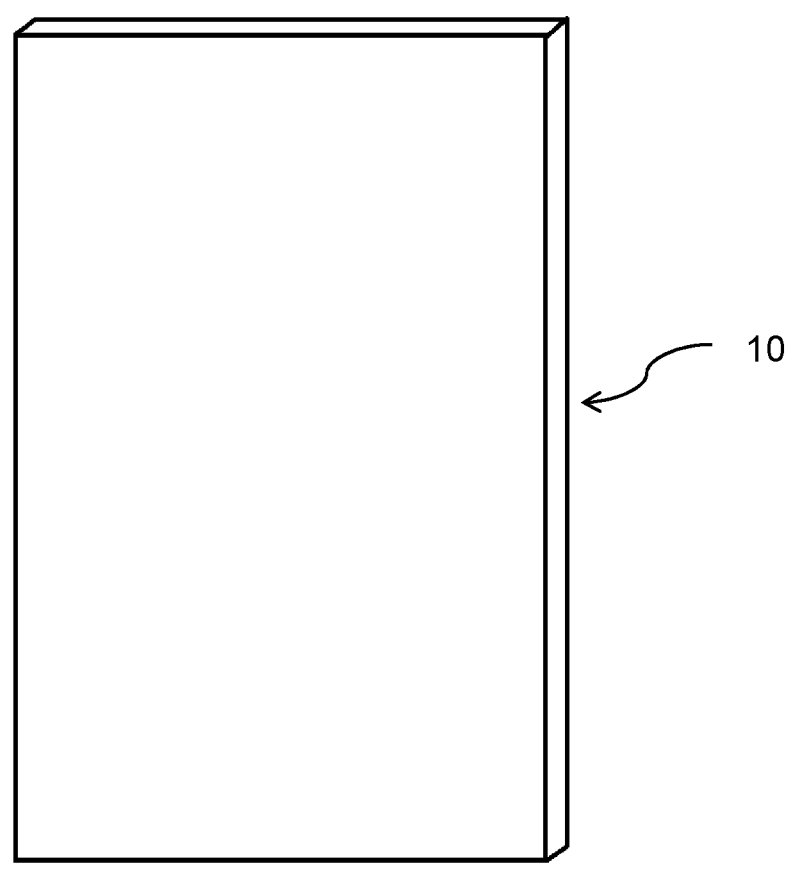
FIG. 2 shows a top (axial) view of the gypsum board of FIG. 1.

FIG. 1 depicts an example of a wallboard panel 10 of the invention (also known as a board). FIG. 2 shows a top (axial) view of the wallboard panel 10.

FIG. 1 depicts the wallboard panel 10 of the invention comprising:

a front first cover sheet 16 (also known as a facer cover sheet) and a back second cover sheet 14 (also known as a backer cover sheet) on opposed sides of the gypsum board 10, the front first cover sheet 16 having first 20 and second 26 opposed surfaces, and the back second cover sheet having third 24 and fourth 21 opposed surfaces;

optionally a first board layer 22 comprising gypsum comprising calcium sulfate dihydrate contacting the front first cover sheet, wherein the first board layer has a first board layer density of 45-55 lbs/ft3, a second board layer 23 comprising gypsum comprising calcium sulfate dihydrate, wherein the second board layer has a second board layer density of 33-43 lbs/ft3, if the first board layer is present then the second board layer density is lower than the first board layer density, and a third board layer 12 comprising gypsum comprising calcium sulfate dihydrate, wherein the third board layer 12 has a third board layer density of 22-30 lbs/ft3 which is lower than the second board layer density, wherein the first board layer 22 if present, the second board layer 23 and the third board layer 12 are between the front first cover sheet 16 and the back second cover sheet 14, wherein opposed sides of the first board layer 22 if present respectively contact the second board layer 23 and the first surface 26 of the front first cover sheet 22, wherein opposed sides of the second board layer 23 respectively contact the first board layer 22 if present and the third board layer 12, wherein if the first board layer 22 is not present then opposed sides of the second board layer 23 respectively contact the front first cover sheet 16 and the third board layer 12, wherein opposed sides of the third board layer (12) respectively contact the second board layer 23 and the third surface 24 of the back second cover sheet 14;

wherein the first board layer if present, second board layer and third board layer comprise at least 60 wt. %, preferably at least 70 wt. %, more preferably at least 80 wt. %, furthermore preferably at least 90 wt. %, or most preferably at least 95 wt. % typically 60 to 98 wt. %, calcium sulfate dihydrate.

The back cover sheet 14 (also known as a backer cover sheet) and a front cover sheet 16 (also known as a facer cover sheet), may each be single-ply or multi-ply paper or fibrous material such as glass fiber mat. The inner surface 24 of the back cover sheet 14 creates a bond side of the back cover sheet 14 which faces the gypsum core 28. The inner surface 26 of the front cover sheet 16 creates a bond side 26 of the front cover sheet 16 which faces the gypsum lower-density region 12. The outer surface 21 of the back cover sheet 14 faces wall framing (not shown) of a room after the wallboard panel 10 is installed as an interior wall. The outer surface 20 of the front cover sheet 16 faces inside of a room after the wallboard panel 10 is installed as an interior wall. Typically the gypsum core 28 has a thickness of 0.3 inches to 1.5 inches.

Generally the relatively lower-density region 12, the middle density region 23, and relatively higher-density region 22 have the same composition and are contiguous with one another. However, the middle density region 23 and the lower-density region 12 may be formed from a gypsum slurry in a foamed state, whereas the relatively higher-density region 22, if present, may be from a gypsum slurry that is not foamed so that a denser layer forms. That is, the higher-density region 22 may have a lower porosity associated therewith than does the middle density region 23, and relatively higher-density region 22.

When foamed the gypsum lower-density region layer and middle-density region layer resulting from the respective set foamed gypsum slurries typically has respective a total void volume of 50 to 92 volume percent and 55 to 92 volume percent. The set higher density region layer has a total void volume of 40 to 85 volume percent. The total void volume of the gypsum lower-density region layer is greater than the total void volume of the gypsum higher-density region layer.

The density of the middle-density region layer 23 of the board 10 is greater than the density of the lower-density region layer 12. The density of the higher-density region layer 22, if present, of the board 10 is greater than the density of the middle-density region layer 23 and greater than the density of the lower-density region layer 12.

The higher-density region 22, if present, typically has a density of 45-70 pounds/cubic foot, more typically 50-60 pounds/cubic foot.

The middle-density region 23 typically has a density of 33-43 lbs/ft3, more typically 38-40 lbs/ft3.

The lower-density region 12 typically has a density of 22-30 lbs/ft3, more typically 25-27 lbs/ft3.

The gypsum densified layer 22, if present, will be thinner and denser than the middle-density region layer 23 and the lower-density region layer 12.

The combined density of the gypsum lower-density region 12 and the higher-density region 22 may be about 25 pounds/cubic foot to about 55 pounds/cubic foot, for example 25 pounds/cubic foot to 55 pounds/cubic foot or 30 pounds/cubic foot to 45 pounds/cubic foot.

The lower-density region (e.g., lower-density region 12 of FIG. 1) resulting from the set gypsum lower-density region slurry generally has a thickness of 0.2 inches to 1.0 inches (0.508 cm to 2.54 cm), typically 0.2 inches to 0.75 inches (0.508 cm to 1.905 cm), or 0.3 inches to 0.5 inches (0.762 cm to 1.27 cm).

The middle-density region (e.g., middle-density region 23 of FIG. 1) resulting from the set gypsum lower-density region slurry generally has a thickness of 0.05 inches to 1.0 inch (0.127 cm to 2.54 cm), typically 0.2 inches to 0.75 inches (0.508 cm to 1.905 cm), or 0.3 inches to 0.5 inches (0.762 cm to 1.27 cm).

If present, the higher-density region (e.g., higher-density region 22 of FIG. 1) generally has a thickness of 2% to 25% of the thickness of the gypsum board 10. Typically the higher-density region 22 has a thickness of about 0.02 inches to about 0.2 inches (about 0.05 cm to about 0.5 cm), for example, about 0.02 inches to about 0.05 inches (about 0.05 cm to about 0.127 cm), or about 0.0625 inch to about 0.125 inch (about 0.16 cm to about 0.32 cm).

Typically the thickness of the lower-density region layer 12 is greater than the thickness of the higher-density region layer 22, if the higher-density region layer 22 is present. Typically the thickness of the middle-density region layer 23 is greater than the thickness of the higher-density region layer 22, if the higher-density region layer 22 is present.

Typically the gypsum board has a transverse width of 3 to 5 feet and length of 8 to 12 feet.

The cover sheet materials may be uncoated or coated with, for example, a pre-applied outer surface polymer coating and a hydrophobic finish. Typically the outer surface of the applied moving webs 14 and 16 as well as the resulting outer surface of the front and back cover sheets of the gypsum board are uncoated and in contact with no additional layers.

Methods for Manufacture of Gypsum Boards

Various methods can be employed for preparing a gypsum board of the present invention from an aqueous gypsum slurry comprising calcium sulfate hemihydrate.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion (calcination) of the dihydrate form of calcium sulfate ($CaSO_4$).

The present invention provides a method to manufacture a gypsum board comprising:

depositing a front first cover sheet, having first and second opposed surfaces, over a forming surface and moving the front first cover sheet horizontally in a machine direction "T" along the forming surface;

optionally depositing a first aqueous gypsum slurry 70 on the front first cover sheet 16 moving in the machine direction "T" to form a first aqueous gypsum slurry layer 76 as a higher-density region in layer form contacting an upper surface 26 of the front first cover sheet 16, wherein the first aqueous gypsum slurry layer 76 has a first slurry density of 75-100 lbs/ft3;

depositing a second aqueous gypsum slurry 77 in a foamed state on the first aqueous gypsum slurry layer 76, if the first aqueous gypsum slurry layer 76 is present, or if the first aqueous gypsum slurry layer is not present depositing the second aqueous gypsum slurry 77 in a foamed state on the front first cover sheet 16, to form a second aqueous gypsum slurry layer as a middle-density region in layer form contacting an upper surface of the first aqueous gypsum slurry layer 76, if the first aqueous gypsum slurry layer is present, or if the first aqueous gypsum slurry layer is not present contacting an upper surface 26 of the front first cover sheet 16, wherein the second aqueous gypsum slurry layer has a second slurry density of 40-65 lbs/ft3, wherein if the first aqueous gypsum slurry 70 is present the second slurry density is lower than the first slurry density, and depositing a third aqueous gypsum slurry 75 in a foamed state on the second aqueous gypsum slurry layer to form a third aqueous gypsum slurry layer as a lower-density region in layer form contacting an upper surface of the second aqueous gypsum slurry layer, wherein the third aqueous gypsum slurry layer has a third slurry density of 30-55 lbs/ft3 which is lower than the second aqueous slurry density;

wherein the optional first aqueous gypsum slurry 70, the second aqueous gypsum slurry 77 and the third aqueous gypsum slurry 75 comprise a respective mixture of water and stucco, wherein the stucco comprises calcium sulfate hemihydrate, wherein the optional first aqueous gypsum slurry 70, the second aqueous gypsum slurry 77 and the third aqueous gypsum slurry 75 each comprises a respective mixture of at least 60 wt. %, preferably at least 70 wt. %, more preferably at least 80 wt. %, furthermore preferably at least 90 wt. %, or most preferably at least 95 wt. %, typically 60 to 98 wt. % said calcium sulfate hemihydrate on a dry (water free) basis, and the water at a weight ratio of water to the calcium sulfate hemihydrate of 0.2:1 to 1.2:1;

passing a back second cover sheet 14, having third 24 and fourth 21 opposed surfaces, over a first transition roller 54 spaced above the front first cover sheet 16, and subsequently applying the back second cover sheet 14 over the third aqueous gypsum slurry layer, to form a multilayer assembly including the front first cover sheet, optionally the first aqueous gypsum slurry layer on the first cover sheet, the second aqueous gypsum slurry layer on the first layer, if the first layer is present, or if the first layer is not present then the second layer is on the first cover sheet, the third aqueous gypsum slurry layer on the second aqueous gypsum slurry layer, and the back second cover sheet over the third aqueous gypsum slurry layer, with the third surface of the second back cover sheet facing the third aqueous gypsum slurry layer, preferably the third aqueous gypsum slurry layer contacting the second aqueous gypsum slurry layer;

passing the multilayer assembly into a forming station 86 for forming the multilayer assembly, wherein preferably the multilayer assembly passes under a forming plate 86A of the forming station;

setting the calcium sulfate hemihydrate respectively of the optional first aqueous gypsum slurry layer, the second aqueous gypsum slurry layer, and the third aqueous gypsum slurry layer by respectively reacting the calcium sulfate hemihydrate with the water of the optional first aqueous gypsum slurry layer, the second aqueous gypsum slurry layer, and the third aqueous gypsum slurry layer to form a panel comprising a gypsum core of an optional first board layer comprising calcium sulfate dihydrate, a second board layer comprising calcium sulfate dihydrate, and a third board layer comprising calcium sulfate dihydrate between the front first cover sheet and back second cover sheet, wherein the first board layer, if present, has a first board layer density, wherein the second board layer has a second board layer density, wherein if the first board layer is present the second board layer density is lower than the first board layer density, and wherein the third board layer has a third board layer density lower than the second board layer density; and cutting and drying the panel into the gypsum board; and wherein the method comprises:

A) said depositing of the third aqueous gypsum slurry to comprise directing the third aqueous gypsum slurry on the third surface 24 of the back second cover sheet 14, passing the back second cover sheet 14 with the third aqueous gypsum slurry over the first transition roller 54 spaced above the first front cover sheet, while the fourth surface 21 of the back second cover sheet contacts the first transition roller 54, so that a majority of the third aqueous gypsum slurry falls off the back second cover sheet 14 onto the second aqueous gypsum slurry over the front first cover sheet 16; or B) said depositing of the second aqueous gypsum slurry to comprise directing the second aqueous gypsum slurry on the third surface 24 of the back second cover sheet 14, passing the back second cover sheet 14 with the second aqueous gypsum slurry over the first transition roller 54 spaced above the front first cover sheet 16, while the fourth surface 21 of the back second cover sheet 14 contacts the first transition roller 54, so that a majority of the second aqueous gypsum slurry falls off the back second cover sheet 14 onto the deposited first aqueous gypsum slurry if present or, if the first aqueous gypsum slurry is not present, onto the front first cover sheet 16, and then depositing the third aqueous gypsum slurry onto the deposited second aqueous gypsum slurry.

To produce gypsum board, the particles of stucco material containing calcium sulfate hemihydrate are mixed with water and, if desired, other additives to form an aqueous gypsum slurry which is continuously fed between continuous layers of paper on a board machine. One cover sheet is called the face cover sheet, or front cover sheet or facer. The other cover sheet is called the back cover sheet, or backer. Since gypsum board is normally formed "face down," this first cover sheet typically corresponds to the facer (front cover sheet) upon completion of the fabrication process. Typically the stucco is mixed with water and additives to form an aqueous slurry which is continuously fed between continuous layers of sheets, e.g., paper sheets, on a board machine. To form the aqueous gypsum slurry, dry and/or wet components of the aqueous gypsum slurry are fed to a mixer (e.g., a pin or pinless mixer), where they are agitated. The aqueous gypsum slurry can be made with any suitable water/calcium sulfate hemihydrate ratio. As the board moves down a conveyer line to form a panel the calcium sulfate hemihydrate recrystallizes or rehydrates, to revert to calcium sulfate dihydrate in its original rock state. The cover sheet becomes bonded to the core as the gypsum sets. The panel is then cut to length and conveyed through dryers to remove any free moisture.

Figure 3:
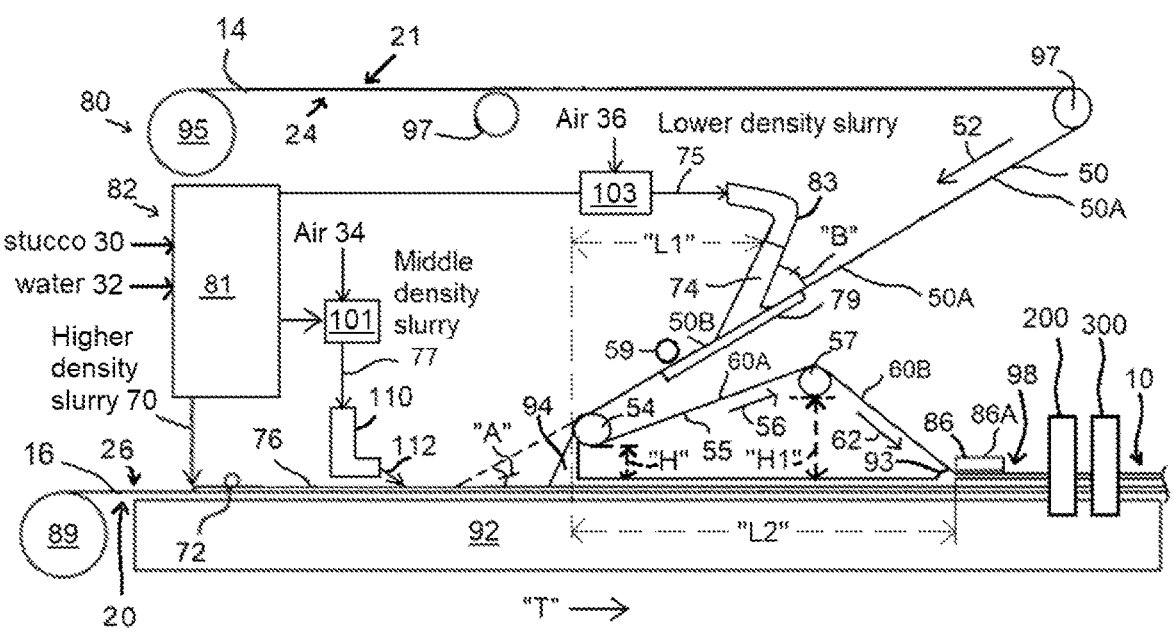
FIG. 3 shows a diagram of a first version of an apparatus to perform the present method.

FIG. 3 shows a first embodiment of an apparatus for performing the present method. In particular, FIG. 3 illustrates an example of a manufacturing production line 80 for producing a layered gypsum board 10 of the present invention having a gypsum layer between two cover sheets, and provided with the optional densified layer 22, the middle-density layer 23 and the lower density layer 12. The cover sheets 14, 16 are, for example, made of paper, for example manila paper or Kraft paper.

In particular the board 10 comprises:

a front first cover sheet 16 and a back second cover sheet 14 on opposed sides of the gypsum board 10, the front first cover sheet 16 having first 20 and second 26 opposed surfaces, and the back second cover sheet having third 24 and fourth 21 opposed surfaces;

optionally a first board layer 22 comprising gypsum comprising calcium sulfate dihydrate contacting the front first cover sheet, wherein the first board layer has a first board layer density of 45-55 lbs/ft3, a second board layer 23 comprising gypsum comprising calcium sulfate dihydrate, wherein the second board layer has a second board layer density of 33-43 lbs/ft3, if the first board layer is present then the second board layer density is lower than the first board layer density, and a third board layer 12 comprising gypsum comprising calcium sulfate dihydrate, wherein the third board layer 12 has a third board layer density of 22-30 lbs/ft3 which is lower than the second board layer density, wherein the first board layer 22 if present, the second board layer 23 and the third board layer 12 are between the front first cover sheet 16 and the back second cover sheet 14, wherein opposed sides of the first board layer 22 if present respectively contact the second board layer 23 and the first surface 26 of the front first cover sheet 22, wherein opposed sides of the second board layer 23 respectively contact the first board layer 22 if present and the third board layer 12, wherein if the first board layer 22 is not present then opposed sides of the second board layer 23 respectively contact the front first cover sheet 16 and the third board layer 12, wherein opposed sides of the third board layer 12 respectively contact the second board layer 23 and the third surface 24 of the back second cover sheet 14.

The first board layer if present, the second board layer and the third board layer comprise at least 60 wt. %, preferably at least 70 wt. %, more preferably at least 80 wt. %, furthermore preferably at least 90 wt. %, or most preferably at least 95 wt. % typically 60 to 98 wt. %, calcium sulfate dihydrate.

The production line 80 includes a gypsum slurry mixing and dispensing assembly 82 and a forming plate 86. For purposes of this disclosure the term gypsum slurry includes the initial slurry of stucco (also known as calcined gypsum, which contains calcium sulfate hemihydrate) and this slurry as it sets wherein the calcium sulfate hemihydrate converts to calcium sulfate dihydrate. FIG. 3 shows the stucco particles 30 and water 32 fed to the gypsum slurry mixing and dispensing assembly 82. The gypsum slurry mixing and dispensing assembly 82 has a mixer 81 and air entraining units (foamer devices) 101 and 103 fed by air 34, 36, respectively.

A first moving web of front first cover sheet material 16 (for example, face sheet from a face paper roll 89) is deposited onto the forming surface 92 and moves in a longitudinal direction of travel (machine direction) "T" along the forming table 92. In particular, the method discharges the first cover sheet 16 onto a moving conveyor 92. The gypsum slurry that will become the lower-density region slurry 75 and the middle-density region slurry 77 and the higher-density region slurry 70 is mixed in the gypsum slurry mixing and dispensing assembly 82 where additives are added. While the gypsum slurry mixing and dispensing assembly 82 is illustrated as a single component of the production line 80, there can be multiple components that comprise the gypsum slurry mixing and dispensing assembly 82.

The cover sheet materials may be uncoated or coated with, for example, a pre-applied outer surface polymer coating and a hydrophobic finish. Typically the outer surfaces 20, 21 of the applied moving cover sheets web 14 and 16, as well as the resulting outer surfaces 20, 21 of the front and back cover sheets 14 and 16 of the gypsum board 10, are uncoated and in contact with no additional layers.

FIG. 3 shows the densified layer slurry 70, the middle density slurry 77, and the lower density slurry 75 coming from the gypsum slurry mixing and dispensing assembly 82. In an alternative embodiment (not shown) these slurries 70, 77, 75 may come from the separate slurry mixers. Typically the gypsum lower-density region layer slurry stream 94, the slurry stream 77 for the gypsum middle-density region layer, and the slurry stream 75 for the gypsum densified layer come from the gypsum slurry mixing and dispensing assembly 82 and have the same composition. For example, the gypsum slurry mixing and dispensing assembly 82 comprises a mixer 81 and three slurry discharge conduits. One slurry discharge conduit connected to the mixer 81 to provide the high density aqueous gypsum slurry 70. Another slurry discharge conduit connected to the mixer 81 to provide the middle density aqueous gypsum slurry 77, and another conduit connected to the mixer 81 to provide the lower density aqueous gypsum slurry 75.

The relatively higher-density aqueous gypsum slurry (densified layer slurry) 70 is applied to the first cover sheet material 16 (for example face paper or glass mat) to form a densified layer (e.g. higher-density region 22, FIG. 1) on the first cover sheet material 16. The front first cover sheet 16 (face paper or face cover sheet) then passes under a densified layer roller 72 to spread the first portion of the aqueous gypsum slurry 70 to provide a first layer of aqueous gypsum slurry (relatively denser layer slurry) 76. Then the front first cover sheet 16 with the layer 76 of the denser slurry 70 moves horizontally along the forming surface 92 in machine direction "T". The densified layer 22 and the relatively higher density aqueous gypsum slurry for making the densified layer 22 are optional.

Typically the densified layer slurry 70 is not foamed.

Typically the middle density aqueous gypsum slurry 77 and the lower density aqueous gypsum slurry 75 are deposited in a foamed state. Thus, after mixing, the middle density aqueous gypsum slurry 77 and the lower density aqueous gypsum slurry 75 typically have foam that contains air added to decrease the product density. Thus the calcined gypsum (calcium sulfate hemihydrate) middle-density region layer slurry 77 and the gypsum lower-density region layer slurry 75 slurry pass through a foamer device 101, 103, fed by air 34, 36, respectively, which for instance mixes the calcined gypsum lower-density region layer slurry stream 74 with foam and/or air, prior to deposition on the first cover sheet material 16.

The foamed middle density slurry 77 then passes to a dispensing unit 110 for discharging the foamed middle density slurry 77 as a discharged stream 112 over the first facer cover sheet 16. The dispensing unit 110 typically includes a boot (as shown) at a downstream end of a hose. A boot is an "L" shaped conduit.

The foamed lower density slurry 75 then passes to a dispensing unit 83 for discharging the foamed lower density slurry 75 as a discharged stream 74 onto the second backer cover sheet 14. The dispensing unit 83 typically includes a hose and optionally a boot (not shown) at a downstream end of the hose. A boot is an "L" shaped conduit. A typical discharge conduit 83, 110 is a gate-canister-boot arrangement as known in the art, or an alternative arrangement, such as that described in U.S. Pat. Nos. 6,494,609 and 6,874,930.

Foam is generated by combining soap and water. The foam may then be injected into the aqueous gypsum slurry after it exits from the mixer through a hose or chute. Foam is typically added to the portion of aqueous gypsum slurry for the middle density aqueous gypsum slurry 77 and the lower density aqueous gypsum slurry 75, but not for the higher density aqueous gypsum slurry 70.

Thus, embodiments of the invention typically comprise adding a foaming agent to the portions of the aqueous gypsum slurry 74 to make the middle density aqueous gypsum slurry 77 and the lower density aqueous gypsum slurry 75. The foaming agent may or may not include alpha-sulfo fatty acid di-salts.

Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. The slurries discharged from the respective discharge conduits after all ingredients have been added, including foaming agent, for the middle density aqueous gypsum slurry 77 and the lower density aqueous gypsum slurry 75 are used to form the middle density region layer 23 and the lower-density region layer 12.

In an alternative (not shown), the mixer 81 can discharge only foamed calcined gypsum (calcium sulfate hemihydrate) slurry and the densified layer can be achieved by directing a portion of the gypsum slurry out of the mixer and into a densified layer mixer prior to introduction of foam into the gypsum slurry or by beating foam out of the gypsum densified layer slurry.

In another alternative (not shown), the deposited calcined gypsum slurries 77, 94 and 70 can come from separate mixers (not shown) to have different properties, such as different compositions and/or densities.

The back cover sheet 14 moves from a back cover sheet roll 95 along rollers to a back cover sheet (back paper) path comprising a first path segment 50, and a second path segment 55. Thus, the apparatus includes a back cover sheet drive defining the back cover sheet path having the first path segment 50 and the second path segment 55. In FIG. 3 the second path segment 55 has an upstream portion 60A and a downstream portion 60B. As seen in FIG. 3, the back cover sheet 14 travels alone (other than with the slurry it conveys) along the first path segment 50 and the second path segment 55 such that it is not traveling on a moving belt. This avoids problems arising from having a moving belt for conveying slurry.

The first path segment is adapted and configured for moving the back second cover sheet 14 to the first transition roller 54, above the layer of aqueous gypsum slurry on the front first cover sheet 16 deposited from the first transition roller, with movement comprising a first horizontal movement component and an optional first vertical movement component. The first horizontal movement component being movement in a direction opposite to the machine direction "T". The first vertical movement component being movement towards the first transition roller in a neutral direction, to provide movement only along the first horizontal movement component, or a downwards direction. The first vertical movement component and the first horizontal movement component may both simultaneously present along all or a same portion of the first segment. This moves the back second cover sheet 14 to the first transition roller 54 along a slope defining an angle of incidence "A" of the slope relative to the first cover sheet 16 traveling on the forming surface below the first transition roller 54. The angle of incidence "A", is an acute angle typically in a range having a minimum of 0, 5, 10, 15, or 20 degrees and a maximum of 20, 30, 45, or 60 degrees (see FIGS. 3 and 4). The minimum is equal to or less than the maximum, for example, a suitable range has a minimum of 20 degrees and a maximum of 30 degrees.

Typically the first vertical movement component and the first horizontal movement component are both simultaneously present along all or a same portion of the first path segment 50. As a result, the back cover sheet 14 moves along at least the downstream portion 50B of the first path segment 50 in the first direction 52 of back-paper travel with a slope inclined downwardly towards the denser layer (higher-density region) on the face cover sheet 16 with the angle "A".

However, the first vertical movement component and the first horizontal movement component may be sequential along different portions of the first path segment 50, as for example in a system (not shown) wherein portion 50A is modified to be a vertical upstream portion for the first vertical movement followed by portion 50B modified to be a horizontal portion downstream portion for the first horizontal movement.

The method or apparatus of FIG. 3 discharges the foamed lower density gypsum slurry 75 as a discharge stream 74 though a gypsum slurry dispensing assembly 83 in a direction of concurrent flow with the direction of movement of the back second cover sheet 14 to contact the third surface 24 of the back second cover sheet 14 in the first path segment 50. This contact is at an angle of incidence "B" in a range of 0 to 90 degrees, typically having a minimum of 0, 5, 10 or 15 degrees and a maximum of 5, 10, 15, 30, 45 or 60 degrees, wherein the minimum is equal to or less than the maximum, for example typical ranges may be 0 to 5 degrees, or 5 to 20 degrees, relative to the third surface 24 of the back second cover sheet 14. Typically the slurry outlet of the gypsum slurry dispensing assembly 83 discharges the second portion of the aqueous gypsum slurry 74 onto a portion of the back cover sheet 14 supported by a back-plate 79. Downstream of the slurry outlet a roller 59, or other suitable device, is optionally provided to spread the lower density slurry 75 discharged as the aqueous gypsum slurry 74. For example the roller 59, or other suitable device, may be provided over the back-plate 79.

At a downstream end of the first path segment 50 the back second cover sheet 14 carrying the lower density gypsum slurry 75 passes around a first transition roller 54 to deposit a majority of the second portion of the gypsum slurry 94 on the denser layer 76 on the front first cover sheet 16. To facilitate this depositing the first transition roller 54 is spaced a distance "H" above the front first cover sheet 16 to be above the higher-density slurry 76 and middle density slurry 77 on the front first cover sheet 16, Thus, the majority of the second portion of the gypsum slurry 74 drops away from the back cover sheet 74 as stream 94 and travels across the distance "H". Distance "H" in the present invention is typically 2 to 60 inches, more typically 2 to 18 inches, 3 to 12 inches, or 4 to 8 inches, above the front first cover sheet 16 to be above the combined thickness of the first, second and third layers of aqueous gypsum slurry. In other words, the second portion of the gypsum slurry 74 is conveyed or 'rains-down' as stream 94 from the back second cover sheet 14 at the downstream end of the first path segment 50 onto the middle density slurry 77 on the front first cover sheet 16. The velocity of the lower density gypsum slurry 75 slows down by the time it reaches the downstream end of the first path segment relative to its velocity it had as discharged slurry 74 when it initially contacted the back second cover sheet 14. Thus, the lower density gypsum slurry 75 deposits from the back second cover sheet 14 over the front first cover sheet 16 at a lower velocity it had when it initially contacted the back second cover sheet 14 in the first path segment 50. As this deposition occurs a remainder of the lower density gypsum slurry 75 remains in contact with the back second cover sheet 14 as the back second cover sheet 14 moves into the second path segment 55.

The first transition roller 54 is preferably a freewheeling roller.

Also, at the downstream end of the first path segment 50, as the back cover sheet 14 passes around the first transition roller 54, the back cover sheet 14 feeds the second path segment 55 and the direction of movement of the back cover sheet 14 changes to the second direction of back-paper travel 56. This movement is above the layer of aqueous gypsum slurry on the front first cover sheet 16 deposited from the first transition roller 54. In particular, the first transition roller 54 changes the direction of movement of the back second cover sheet to movement along a first portion of the second path segment 55 that has a second horizontal movement component in the machine direction and a second vertical movement component. The second vertical movement component being upwards, or downwards, or neutral to provide movement only along the second horizontal movement component. Typically the second vertical movement component is movement in a direction upwards away from the front first cover sheet. Thus, the second path segment 55 takes up the back cover sheet 14 and pivots it to be further above the front first cover sheet 16.

Thus preferably, as shown in FIG. 3, the back second cover sheet drive comprises the first transition roller 54 and the second transition roller 57 for moving the back second cover sheet 14 along the back second cover sheet path comprising the first path segment 50 and the second path segment 55. Typically the second path segment 55 has a first portion 60A and a second portion 60B, wherein at a downstream end of the first portion 60A of the second path segment 55 the back second cover sheet 14 passes over the second transition roller 57 to change the direction of movement of the back second cover sheet 14 to a third direction of back-paper travel 62 and feed the back second cover sheet 14 to the second portion 62 of the second path segment 60B. The second path segment 60B feeds the forming station 86 at a downstream end of the second path segment 55. The second transition roller 57 at the beginning of the third path segment 60 is preferably at a sufficiently raised position of a distance "H1" above the front first cover sheet 16 for a head 93 (See FIG. 3) of slurry at the end of the third path segment to be visible and for ease of operators to manage and access the forming plate region. Distance "H1" in the present invention is typically 6 to 60 inches above the front first cover sheet 16.

In particular, at the downstream end of the second path segment 55 the back second cover sheet 14 is deposited on the lower density aqueous gypsum slurry 94 on the front first cover sheet 16 to form a multilayer assembly (sandwich assembly) with the slurry between the two facing cover sheets 14, 16. The resulting multilayer assembly is in the form of a wet assembly, which is a precursor to the final gypsum board product. Then the multilayer assembly is fed to a forming station 86 and typically passes under a forming plate 86A of the forming station 86 to compress the layers into a desired total thickness. The resultant structure is a gypsum board preform 98.

The second transition roller 57 may be a freewheeling roller or a driven roller.

Figure 5:
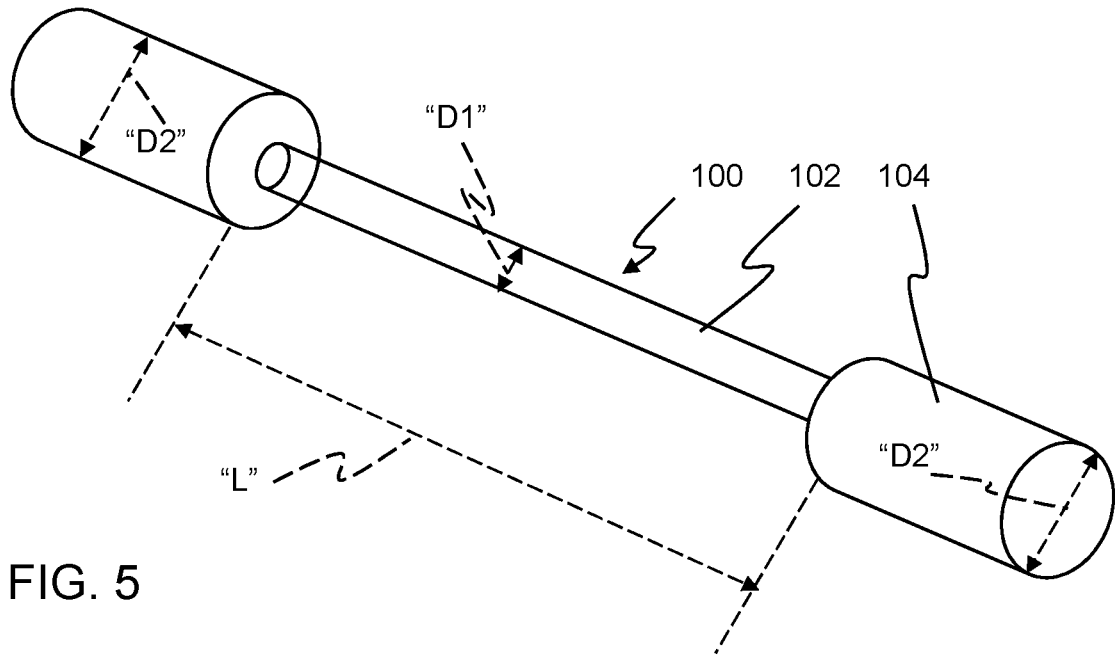
FIG. 5 shows the bare-center shaft roller having a central shaft of a first diameter and opposed cylindrical end portions.

Optionally the second transition roller 57 can be a bare-center shaft roller to reduce the cleaning load on this roller since it is in the same side as the slurry-exposed side of the back-paper. FIG. 5 shows the bare-center shaft roller 100 having a central shaft 102 of a first diameter "D1" and opposed cylindrical end portions 104 of a second diameter "D2", wherein the second diameter "D2" is larger than the first diameter "D1". The center bare-shaft roller avoids cleaning at the second transition roller 57 exposed to gypsum slurry on the back cover sheet 14. The opposed cylindrical end portions 104 are spaced a length "L" that is greater than the spread of any slurry on the front first cover sheet 16.

The height of the forming plate or other forming device above the front first cover sheet 16 determines the thickness of the board. The forming station 86 is the location in the board manufacturing line 80 where wet board precursor is sized to a pre-determined width and thickness, and optionally, length. Thus, the forming station 86 includes, or can be, the forming plate 86A or any device capable that is capable of performing a final mechanical spreading and/or shaping of the slurry across the width of the backing layer, many of which are known in the art to create the desired slurry thickness and width of the wet board precursor. Suitable devices include, for example, forming plate 86A, a forming roller, a forming press, a screed, and the like. The particular device used will depend, in part, on the type of cementitious board being produced. In a preferred embodiment, for example when the board forming system is a gypsum board or acoustical panel forming system, the board forming station comprises a forming plate as is known in the art. The board forming system of any of the above embodiments optionally further comprises a blade for cutting wet board precursor or dry cementitious board product to the desired lengths, and/or a drying region capable of removing water from the set cementitious board.

Thus, the forming station 86 conforms the slurry thickness and width to the final desired thickness and width of a wet board precursor that, when set, will produce the cementitious board product. The final desired slurry thickness and width produced at the forming station 86 can, of course, differ from the final thickness and width of the finished board product. For example, the slurry thickness and/or width can expand and/or contract during crystallization (i.e., setting) and drying of the slurry. Typically, the desired slurry thickness is substantially equal to the desired board thickness (e.g., about 0.375" (about 0.95 cm), about 0.5" (about 1.27 cm), about 0.625" (about 1.59 cm), about 0.75" (about 1.90 cm), or about 1" (about 2.54 cm). By way of illustration only, the final board thickness typically is within about + or −⅛" (about 0.32 cm) or less of the final slurry thickness.

Next the continuous multilayer assembly is cut in a cutting station 200 into appropriate lengths at a cutting knife, usually eight feet to twelve feet. As the board moves down a conveyer line to form a panel the slurry is allowed to harden (set). The calcium sulfate recrystallizes or rehydrates, reverting to its original rock state to form a board core comprising an interlocking crystalline matrix of set gypsum. The cover sheets become bonded to the core as the gypsum sets. The panel is then cut to length and conveyed through kilns or dryers 300 to remove any free moisture and result in the board 10. Temperatures in the kiln typically range from 450° F. to 500° F.

Typically the horizontal distance "L1" from the slurry outlet of the gypsum slurry dispensing assembly 83 to the upstream end of the first transition roller 54, from which the aqueous gypsum slurry 94 drops over the deposited middle density aqueous gypsum slurry, on the first facer cover sheet 16 is 10 to 30 feet. Typically the horizontal distance "L2" from the upstream end of the first transition roller 54, from which the aqueous gypsum slurry 94 drops over the deposited middle density aqueous gypsum slurry, to the forming plate 86A or any other device that is capable of creating the desired slurry thickness and width of the wet board precursor is 10 to 30 feet.

Typically the line speed in direction "T" is 1-20 feet/second, more typically 2-10 feet/second.

The gypsum densified layer roller 72, the forming table (conveyer belt) 92, the forming plate 86A can all comprise conventional equipment suitable for their intended purposes as is known in the art. The production line 80 can be equipped with other conventional equipment as is known in the art.

In FIG. 3 the depositing of the third aqueous gypsum slurry (lower density slurry 75) comprises directing the third aqueous gypsum slurry on the third surface 24 of the back second cover sheet 14, passing the back second cover sheet 14 with the third aqueous gypsum slurry over the first transition roller 54 spaced above the first front cover sheet 16, while the fourth surface 21 of the back second cover sheet 14 contacts the first transition roller 54, so that a majority of the third aqueous gypsum slurry falls off the back second cover sheet 14 onto the second aqueous gypsum slurry (middle density slurry 77) on the front first cover sheet 16. If the optional first portion of aqueous gypsum slurry (higher density slurry 70) was deposited as shown in FIG. 3, then the majority of the third aqueous gypsum slurry falls off the back second cover sheet 14 onto the second aqueous gypsum slurry (middle density slurry 77) that is on the first portion of aqueous gypsum slurry on the front first cover sheet 16.

Figure 4:
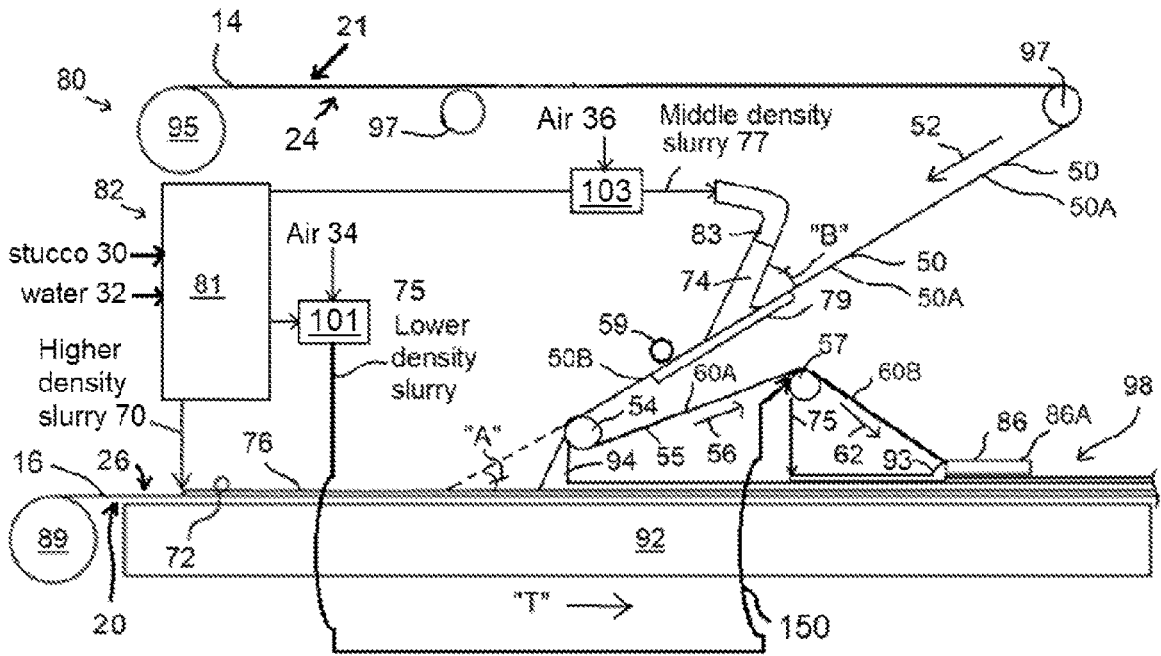
FIG. 4 shows a diagram of a second version of an apparatus to perform the present method.

In contrast, FIG. 4 shows detailed aspects of a diagram of another alternative version of the present method that is a modified version of the embodiment of FIG. 3.

In FIG. 4 the depositing of the second aqueous gypsum slurry (middle density slurry 77) comprises directing the second aqueous gypsum slurry 77 on the third surface 24 of the back second cover sheet 14, passing the back second cover sheet (14) with the second aqueous gypsum slurry 77 over the first transition roller 54 spaced above the front first cover sheet 16, while the fourth surface 21 of the back second cover sheet 14 contacts the first transition roller 54, so that a majority of the second aqueous gypsum slurry 77 falls off the back second cover sheet 14 onto the deposited first aqueous gypsum slurry 76 if present or, if the optional first aqueous gypsum slurry (higher density slurry) is not present, onto the front first cover sheet 16, and then depositing the third aqueous gypsum slurry 75 onto the deposited second aqueous gypsum slurry 77 (middle density slurry). Preferably the depositing the third aqueous gypsum slurry 75 (lower density slurry) onto the deposited second aqueous gypsum slurry 77 is performed by directing the third aqueous gypsum slurry 75 through a conduit 150 that goes around the forming table 92 to discharge from the conduit 150 onto the second transition roller 57. Then the third aqueous gypsum slurry (lower density slurry 75) drops from the second transition roller 57 onto the deposited second aqueous gypsum slurry 77 (middle density slurry). Downstream of the slurry outlet a roller 59, or other suitable device, is optionally provided to spread the middle density slurry 77 discharged as aqueous gypsum slurry 74. For example the roller 59, or other suitable device, may be provided over the back-plate 79.

As in FIG. 3, at the downstream end of the second path segment 55 the back second cover sheet 14 is deposited on the lower density aqueous gypsum slurry 94 on the front first cover sheet 16 to form a multilayer assembly (sandwich assembly) with the slurry between the two facing cover sheets 14, 16.

Next the continuous multilayer assembly is formed in a forming station 86, cut in a cutting station 200 into appropriate lengths at a cutting knife, usually eight feet to twelve feet. As the board moves down a conveyer line to form a panel the slurry is allowed to harden (set). The calcium sulfate recrystallizes or rehydrates, reverting to its original rock state to form a board core comprising an interlocking crystalline matrix of set gypsum. The cover sheets become bonded to the core as the gypsum sets. The panel is then cut to length and conveyed through kilns or dryers 300 to remove any free moisture and result in the board 10. Temperatures in the kiln typically range from 450° F. to 500° F.

Typically the distance from the slurry outlet of the gypsum slurry dispensing assembly 83 to the upstream end of the first transition roller 54, from which the aqueous gypsum slurry 94 drops over the deposited middle density aqueous gypsum slurry, on the first facer cover sheet 16 is 10-30 feet (labelled "L1" in FIG. 3). Typically the horizontal distance from the upstream end of the first transition roller 54, from which the aqueous gypsum slurry 94 drops over the deposited middle density aqueous gypsum slurry, to the forming plate 86A or any other device that is capable of creating the desired slurry thickness and width of the wet board precursor is 10 to 30 feet (labelled "L2" in FIG. 3).

Typically the line speed in direction "T" is 1-20 feet/second, typically 2-10 feet/second.

Gypsum and Stucco (Calcined Gypsum)

The calcium sulfate hemihydrate component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. The calcium sulfate hemihydrate is typically provided in the raw material known as stucco or calcined gypsum. In some aspects, the stucco may include non-gypsum minerals, such as minor amounts of clays or other components that are associated with the gypsum source or are added during the calcination, processing and/or delivery of the stucco to the mixer. The stucco can be fibrous or non-fibrous. Typically the raw stucco has at least 70 wt. % calcium sulfate hemihydrate, preferably at least 80 wt. % calcium sulfate hemihydrate, more preferably at least 85 wt. % calcium sulfate hemihydrate, and furthermore preferably at least 90 wt. % calcium sulfate hemihydrate.

Additives

In addition to the set stabilizer particles of the present invention, other additives may be present in the gypsum slurry used to form the board core. Such additives may include, but are not limited to, strengthening agents, foam (prepared from a suitable foaming agent), dispersants, polyphosphates (e.g., sodium trimetaphosphate), starches, retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum lower-density region slurry and/or the higher-density region layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum low density layer slurry and/or the gypsum high density layer slurry in amounts on a dry basis per 100 pbw of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815,049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may also be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalenesulfonates) and derivatives, which are condensation products of naphthalenesulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalenesulfonates are a naphthalene sulfonate solution in water, having a range of about 35% to about 55% by weight naphthalenesulfonate solids content. However, if desired the naphthalenesulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalenesulfonates, polycarboxylic ethers or lignosulfonates.

Accelerators and/or retarders may be added to the gypsum low density layer slurry and/or the high density layer slurry to modify the rate at which the calcium sulfate hemihydrate hydration reactions take place. Suitable accelerators may include, for example, wet gypsum accelerator, heat resistant accelerator (HRA), or climate stabilized accelerator (CSA).

"CSA" is a set accelerator including 95% calcium sulfate dihydrate co-ground with 5% sugar and heated to 250° F. (121° C.) to caramelize the sugar. CSA is made according to U.S. Pat. Nos. 3,573,947 and 6,409,825, herein incorporated by reference. Potassium sulfate is another potential accelerator. HRA (Heat Resistant Accelerator), which is an accelerator, is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators and/or retarders.

Foam (also known as foam water) may optionally be introduced into the gypsum lower-density region slurry and/or the higher-density region slurry (preferably the gypsum lower-density region slurry) in amounts that provide the above mentioned reduced lower-density region density and panel weight. The foaming agent to produce the foam is typically a soap or other suitable surfactant. The introduction of foam in the gypsum lower-density region slurry in the proper amounts, formulations, and process will produce a desired network and distribution of voids within the lower-density region of the final dried wallboards. This void structure permits the reduction of the gypsum and other lower-density region constituents and the lower-density region density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum lower-density region, as described in U.S. Pat. Nos. 5,643,510; 6,342,284; and 6,632,550, which are incorporated herein by reference in their entirety. The approaches for adding foam to a gypsum lower-density region slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like.

If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight.

There may also be an absence of any one or more of these components for fire and/or water resistance. For example, there may be an absence of siloxane.

Water

Water is added to the slurry in any amount that makes a flowable slurry. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum lower-density region slurry and/or the higher-density region layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1; and typically about 0.85:1.

Back Cover Sheet and the Front Cover Sheet

The front and back cover sheets may be made of paper or other fibrous material, such as a mat of glass fibers. The back paper cover sheet and the front cover sheet may be made from any suitable paper material having any suitable basis weight.

If the front and back cover sheets are made of paper, the paper materials for each cover sheet may be the same or different.

Various paper grades can be used in gypsum panels, including Manila grade paper with a smooth calendared finish, often used as the facer paper cover sheet, and Newsline paper with a rougher finish, often used as the backer paper cover sheet. Typically both paper grades are multi-ply with at least one liner ply and several filler plies. However, if desired at least one paper cover sheet or both paper cover sheets are made of single-ply paper.

Typically a back cover sheet only covers the back surface. In contrast, a front cover sheet covers the front surface of the board and also wraps around the board edges to contact the back cover sheet.

If desired, to enhance strength (e.g., nail pull strength), especially for lower density gypsum boards, one or both of the cover sheets can be formed from paper having a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, or the like). If desired, the front paper cover sheet may have a higher basis weight than does the back cover sheet, which may provide enhanced nail pull resistance and handling. The back paper cover sheet can have a somewhat lower basis weight if desired (e.g., a basis weight of less than 45 lbs/MSF, e.g., from about 33 lbs/MSF to 45 lbs/MSF (e.g., about 33 lbs/MSF to about 40 lbs/MSF).

Clauses of the Invention

The following clauses disclose various aspects of the invention.

Clause 1. A method for manufacturing a gypsum board comprising:

depositing a front first cover sheet, having first and second opposed surfaces, over a forming surface and moving the front first cover sheet horizontally in a machine direction along the forming surface;

optionally depositing a first aqueous gypsum slurry on the front first cover sheet moving in the machine direction to form a first aqueous gypsum slurry layer as a higher-density region in layer form contacting an upper surface of the front first cover sheet, wherein the first aqueous gypsum slurry layer has a first slurry density of 75-100 lbs/ft3;

depositing a second aqueous gypsum slurry in a foamed state on the first aqueous gypsum slurry layer, if the first aqueous gypsum slurry layer is present, or if the first aqueous gypsum slurry layer is not present depositing the second aqueous gypsum slurry in a foamed state on the front first cover sheet, to form a second aqueous gypsum slurry layer as a middle-density region in layer form contacting an upper surface of the first aqueous gypsum slurry layer, if the first aqueous gypsum slurry layer is present, or if the first aqueous gypsum slurry layer is not present contacting an upper surface of the front first cover sheet, wherein the second aqueous gypsum slurry layer has a second slurry density of 40-65 lbs/ft3, wherein if the first aqueous gypsum slurry is present the second slurry density is lower than the first slurry density, and depositing a third aqueous gypsum slurry in a foamed state on the second aqueous gypsum slurry layer to form a third aqueous gypsum slurry layer as a lower-density region in layer form contacting an upper surface of the second aqueous gypsum slurry layer, wherein the third aqueous gypsum slurry layer has a third slurry density of 30-55 lbs/ft3 which is lower than the second aqueous slurry density;

wherein the optional first aqueous gypsum slurry, the second aqueous gypsum slurry and the third aqueous gypsum slurry comprise a respective mixture of water and stucco, wherein the stucco comprises calcium sulfate hemihydrate, wherein the optional first aqueous gypsum slurry, the second aqueous gypsum slurry and the third aqueous gypsum slurry each comprises a respective mixture of at least 60 wt. %, preferably at least 70 wt. %, more preferably at least 80 wt. %, furthermore preferably at least 90 wt. %, or most preferably at least 95 wt. %, typically 60 to 98 wt. % said calcium sulfate hemihydrate on a dry (water free) basis, and the water at a weight ratio of water to the calcium sulfate hemihydrate of 0.2:1 to 1.2:1;

passing a back second cover sheet, having third and fourth opposed surfaces, over a first transition roller spaced above the front first cover sheet, and subsequently applying the back second cover sheet over the third aqueous gypsum slurry layer, to form a multilayer assembly including the front first cover sheet, optionally the first aqueous gypsum slurry layer on the first cover sheet, the second aqueous gypsum slurry layer on the first layer, if the first layer is present, or if the first layer is not present then the second layer is on the first cover sheet, the third aqueous gypsum slurry layer on the second aqueous gypsum slurry layer, and the back second cover sheet over the third aqueous gypsum slurry layer, with the third surface of the second back cover sheet facing the third aqueous gypsum slurry layer, preferably the third aqueous gypsum slurry layer contacting the second aqueous gypsum slurry layer;

passing the multilayer assembly into a forming station for forming the multilayer assembly, wherein preferably the multilayer assembly passes under a forming plate of the forming station;

setting the calcium sulfate hemihydrate respectively of the optional first aqueous gypsum slurry layer, the second aqueous gypsum slurry layer, and the third aqueous gypsum slurry layer by respectively reacting the calcium sulfate hemihydrate with the water of the optional first aqueous gypsum slurry layer, the second aqueous gypsum slurry layer, and the third aqueous gypsum slurry layer to form a panel comprising a gypsum core of an optional first board layer comprising calcium sulfate dihydrate, a second board layer comprising calcium sulfate dihydrate, and a third board layer comprising calcium sulfate dihydrate between the front first cover sheet and back second cover sheet, wherein the first board layer, if present, has a first board layer density, wherein the second board layer has a second board layer density, wherein if the first board layer is present the second board layer density is lower than the first board layer density, and wherein the third board layer has a third board layer density lower than the second board layer density; and cutting and drying the panel into the gypsum board; and wherein the method comprises:

A) said depositing of the third aqueous gypsum slurry to comprise directing the third aqueous gypsum slurry on the third surface of the back second cover sheet, passing the back second cover sheet with the third aqueous gypsum slurry over the first transition roller spaced above the first front cover sheet, while the fourth surface of the back second cover sheet contacts the first transition roller, so that a majority of the third aqueous gypsum slurry falls off the back second cover sheet onto the second aqueous gypsum slurry over the front first cover sheet; or B) said depositing of the second aqueous gypsum slurry to comprise directing the second aqueous gypsum slurry on the third surface of the back second cover sheet, passing the back second cover sheet with the second aqueous gypsum slurry over the first transition roller spaced above the front first cover sheet, while the fourth surface of the back second cover sheet contacts the first transition roller, so that a majority of the second aqueous gypsum slurry falls off the back second cover sheet onto the deposited first aqueous gypsum slurry if present or, if the first aqueous gypsum slurry is not present, onto the front first cover sheet, and then depositing the third aqueous gypsum slurry onto the deposited second aqueous gypsum slurry.

Clause 2. The method of clause 1, wherein the back second cover sheet moves along a downstream portion of the first path segment with movement along a slope defining an angle of incidence "A", relative to the first cover sheet traveling on the forming surface below the first transition roller (54), in a range having a minimum of 0, 5, 10, 15, or 20 degrees and a maximum of 20, 30, 45, or 60 degrees, wherein the minimum is equal to or less than the maximum, for example, a suitable range has a minimum of 20 and a maximum of 30 degrees.

Clause 3. The method of clause 1, wherein the foamed second aqueous gypsum slurry or the foamed third aqueous gypsum slurry discharges in a direction of concurrent flow with the direction of movement of the back second cover sheet to contact the third surface of the back second cover sheet in the first path segment. This contact is at an angle of incidence "B" in a range of 0 to 90 degrees, typically having a minimum of 0, 5, 10 or 15 degrees and a maximum of 5, 10, 15, 30, 45 or 60 degrees, wherein the minimum is equal to or less than the maximum, for example 0 to 5 degrees, or 5 to 20 degrees, relative to the third surface of the back second cover sheet.

Clause 4. The method of clause 1, wherein the first transition roller changes the direction of movement of the back cover sheet to movement along a first portion of the second path segment that has a second horizontal movement component in the machine direction and a second vertical movement component, the second vertical movement component being upwards, or downwards, or neutral to provide movement only along the second horizontal movement component, typically the second vertical movement component is movement in a direction upwards away from the higher-density region on the face cover sheet.

Clause 5. The method of clause 1, wherein the second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

Clause 6. The method of clause 1, wherein at the downstream end of the second path segment depositing the back cover sheet on the second portion of aqueous gypsum slurry on the face cover sheet to form the multilayer assembly to include the back cover sheet on the second portion of the aqueous gypsum slurry, preferably including the front cover sheet, the first portion of aqueous gypsum slurry layer on the first cover sheet, the second portion of aqueous gypsum slurry layer on the first portion of aqueous gypsum slurry layer, and the back cover sheet on the second portion of aqueous gypsum slurry layer.

Clause 7. The method of clause 6, wherein the second transition roller is at a sufficiently raised position relative to the face cover sheet moving along the forming surface for a head of slurry at the downstream end of the third path segment to be visible to an operator.

Clause 8. The method of clause 1, wherein the foamed second aqueous gypsum slurry or the foamed third aqueous gypsum slurry discharges onto a portion of the back-cover sheet supported by a back-plate.

Clause 9. The method of clause 1, wherein the front first cover sheet comprises at least one of a glass mat facer sheet or a paper facer sheet.

Clause 10. The method of clause 1, wherein the lower-density region resulting from the set gypsum lower-density region slurry has a thickness of 0.2 inches to 1.0 inches, typically 0.2 inches to 0.75 inch, or 0.3 inches to 0.5 inches.

Clause 11. The method of clause 1, wherein the middle-density region resulting from the set gypsum middle-density region slurry has a thickness of 0.05 inches to 1.0 inches, typically 0.2 inches to 0.75 inches, or 0.3 inches to 0.5 inches.

Clause 12. The method of clause 1, wherein the higher-density region resulting from the set gypsum higher-density region slurry has a thickness of about 0.02 inches to about 0.2 inches (about 0.05 to about 0.5 cm), for example, from about 0.0625 inch to about 0.125 inch (about 0.16 to about 0.32 cm), wherein the thickness of the lower-density region layer is greater than the thickness of the higher-density region layer, wherein the thickness of the middle-density region layer is greater than the thickness of the higher-density region layer.

Clause 13. The method of clause 1, wherein the middle density slurry and the lower-density slurry comprise are foamed and air bubbles, wherein when foamed, the gypsum lower-density region layer and the gypsum middle-density region layer resulting from the set foamed gypsum slurry have a total void volume of 10 to 92 volume percent, particularly 25 to 90 volume percent, and more particularly 30 to 85 volume percent.

Clause 14. The method of clause 17, wherein the air bubbles have an average cross-section diameter of less than 1.5 mm, about 0.5 to about 0.8 mm, about 0.3 mm, or about 0.3 mm or less.

Clause 15. The method of clause 1, wherein the higher density region layer is present and has a total void volume of less than 30 volume percent, for example less than 25 volume percent.

Clause 16. The method of clause 1, further comprising adding air to the second portion of aqueous gypsum slurry prior to depositing the second portion of aqueous gypsum slurry, and adding air to the third portion of aqueous slurry prior to depositing the third portion of aqueous slurry.

Clause 17. The method of clause 1, wherein said depositing of the third aqueous gypsum slurry comprises directing the third aqueous gypsum slurry on the third surface of the back second cover sheet, passing the back second cover sheet with the third aqueous gypsum slurry over the first transition roller spaced above the first front cover sheet, while the fourth surface of the back second cover sheet contacts the first transition roller, so that a majority of the third aqueous gypsum slurry falls off the back second cover sheet onto the second aqueous gypsum slurry on the front first cover sheet.

Clause 18. The method of clause 1, wherein said depositing of the second aqueous gypsum slurry comprises directing the second aqueous gypsum slurry on the third surface of the back second cover sheet, passing the back second cover sheet with the second aqueous gypsum slurry over the first transition roller spaced above the front first cover sheet, while the fourth surface of the back second cover sheet contacts the first transition roller, so that a majority of the second aqueous gypsum slurry falls off the back second cover sheet onto the deposited first aqueous gypsum slurry if present or, if the first aqueous gypsum slurry is not present, onto the front first cover sheet, and then depositing the third aqueous gypsum slurry onto the deposited second aqueous gypsum slurry.

Clause 19. The method of clause 18, wherein the method comprises the depositing of the first aqueous gypsum slurry on the front first cover sheet moving in the machine direction to form the first aqueous gypsum slurry layer as the higher-density region in layer form contacting an upper surface of the front cover sheet, wherein the first aqueous gypsum slurry layer has the first slurry density of 75-100 lbs/ft3.

Clause 20. An apparatus to manufacture a gypsum board according to the method of any of the preceding clauses 1-19, comprising:

a forming surface for depositing thereon a front first cover sheet, having first and second opposed surfaces, and moving the front first cover sheet horizontally in a machine direction along the forming surface;

optionally a source of a first aqueous gypsum slurry for depositing the first aqueous gypsum slurry on the front first cover sheet moving in the machine direction to form a first aqueous gypsum slurry layer as a higher-density region in layer form contacting an upper surface of the front cover sheet, wherein the first aqueous gypsum slurry layer has a first slurry density of 75-100 lbs/ft3, a source of a second aqueous gypsum slurry in a foamed state for depositing the second aqueous gypsum slurry on the first aqueous gypsum slurry layer if present, of if the first aqueous gypsum slurry is not present then on the front first cover sheet, to form a second aqueous gypsum slurry layer as a middle-density region in layer form contacting an upper surface of the first aqueous gypsum slurry layer, wherein the second aqueous gypsum slurry layer has a second slurry density of 40-65 lbs/ft3, wherein if the first aqueous gypsum slurry is present the second slurry density is lower than the first slurry density, a source of a third aqueous gypsum slurry in a foamed state for depositing the third aqueous gypsum slurry on the second aqueous gypsum slurry layer to form a third aqueous gypsum slurry layer as a lower-density region in layer form contacting an upper surface of the second aqueous gypsum slurry layer, wherein the third aqueous gypsum slurry layer has a third slurry density of 30-55 lbs/ft3 which is lower than the second slurry density, wherein the optional first aqueous gypsum slurry, the second aqueous gypsum slurry and the third aqueous gypsum slurry comprise a respective mixture of water and stucco, wherein the stucco comprises calcium sulfate hemihydrate, wherein the optional first aqueous gypsum slurry, the second aqueous gypsum slurry and the third aqueous gypsum slurry respectively comprise a mixture of at least 60 wt. %, preferably at least 70 wt. %, more preferably at least 80 wt. %, furthermore preferably at least 90 wt. %, or most preferably at least 95 wt. %, typically 60 to 98 wt. % said calcium sulfate hemihydrate on a dry (water free) basis, and the water at a weight ratio of water to the calcium sulfate hemi-hydrate of 0.2:1 to 1.2:1; and a back second cover sheet drive comprising a first transition roller spaced above the front first cover sheet for moving a back second cover sheet, having third and fourth opposed surfaces, along a back second cover sheet path and subsequently applying the back second cover sheet over the third aqueous gypsum slurry layer to form a multilayer assembly including the front first cover sheet, optionally the first aqueous gypsum slurry layer on the first cover sheet, the second aqueous gypsum slurry layer on the first aqueous gypsum slurry layer if present, or on the front first cover sheet if the first aqueous gypsum slurry layer is not present, the third aqueous gypsum slurry layer on the second aqueous gypsum slurry layer, and the back second cover sheet over the third aqueous gypsum slurry layer, with the third surface of the back second cover sheet facing the third aqueous gypsum slurry layer;

a forming station for forming the multilayer assembly, wherein preferably the forming station comprises a forming plate for passing the multilayer assembly under the forming plate of the forming station; and a location for respectively setting the calcium sulfate hemihydrate of the optional first aqueous gypsum slurry layer, the second aqueous gypsum slurry layer, and the third aqueous gypsum slurry layer by respectively reacting the calcium sulfate hemihydrate with the water of the optional first aqueous gypsum slurry layer, the second aqueous gypsum slurry layer, and the third aqueous gypsum slurry layer to form a panel comprising a gypsum core respectively of an optional first board layer comprising calcium sulfate dihydrate, a second board layer comprising calcium sulfate dihy-drate, and a third board layer comprising calcium sulfate dihydrate between the front first cover sheet and back second cover sheet;

wherein the first board layer, if present, has a first board layer density, wherein the second board layer has a second board layer density, wherein if the first board layer is present the second board layer density is lower than the first board layer density, and wherein the third board layer has a third board layer density lower than the second board layer density; and a cutting station for cutting the panel into the gypsum board;

a drying station for drying the gypsum board; and wherein the apparatus comprises:

A) said source of the third aqueous gypsum slurry in the foamed state for depositing of the third aqueous gypsum slurry by directing the third aqueous gyp-sum slurry on the third surface of the back second cover sheet, adapting and configuring the first transition roller for passing the back second cover sheet with the third aqueous gypsum slurry over the first transition roller spaced above the first front cover sheet, while the fourth surface of the back second cover sheet contacts the first transition roller, so that a majority of the third portion aqueous gypsum slurry falls off the back second cover sheet onto the second portion of aqueous gypsum slurry on the front first cover sheet; or B) said source of the second aqueous gypsum slurry in the foamed state adapted and configured for depos-iting of the second aqueous gypsum slurry by direct-ing the second aqueous gypsum slurry on the third surface of the back second cover sheet, adapting and configuring the first transition roller for passing the back second cover sheet with the second aqueous gypsum slurry over the first transition roller spaced above the first cover sheet, while the fourth surface of the back second cover sheet contacts the first transition roller, so that a majority of the second portion aqueous gypsum slurry falls off the back second cover sheet onto the deposited first portion of aqueous gypsum slurry if present, or onto the front first cover sheet if the first portion of aqueous gypsum slurry is not present, and said source of the third aqueous gypsum slurry in the foamed state adapted and configured for depositing the third aqueous gypsum slurry in the foamed state onto the deposited second aqueous gypsum slurry.

Clause 22. The apparatus to manufacture a gypsum board according to clause 21, further comprising:

a mixer for preparing an aqueous gypsum slurry for at least one of the first aqueous gypsum slurry, the second aqueous gypsum slurry, and the third aqueous gypsum slurry each comprising a mixture of water, and stucco, wherein the stucco comprises calcium sulfate hemihydrate.

Clause 23. A gypsum board made according to the method of any of clauses 1-20.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more of the element that it introduces.

We claim:

1. A method for manufacturing a gypsum board comprising:

depositing a front first cover sheet, having first and second opposed surfaces, over a forming surface and moving the front first cover sheet horizontally in a machine direction along the forming surface;

optionally depositing a first aqueous gypsum slurry on the front first cover sheet moving in the machine direction to form a first aqueous gypsum slurry layer as a higher-density region in layer form contacting an upper surface of the front first cover sheet, wherein the first aqueous gypsum slurry layer has a first slurry density of 75-100 lbs/ft3;

depositing a second aqueous gypsum slurry in a foamed state on the first aqueous gypsum slurry layer, if the first aqueous gypsum slurry layer is present, or if the first aqueous gypsum slurry layer is not present depositing the second aqueous gypsum slurry in a foamed state on the front first cover sheet, to form a second aqueous gypsum slurry layer as a middle-density region in layer form contacting an upper surface of the first aqueous gypsum slurry layer, if the first aqueous gypsum slurry layer is present, or if the first aqueous gypsum slurry layer is not present contacting an upper surface of the front first cover sheet, wherein the second aqueous gypsum slurry layer has a second slurry density of 40-65 lbs/ft3, wherein if the first aqueous gypsum slurry is present the second slurry density is lower than the first slurry density, and depositing a third aqueous gypsum slurry in a foamed state on the second aqueous gypsum slurry layer to form a third aqueous gypsum slurry layer as a lower-density region in layer form contacting an upper surface of the second aqueous gypsum slurry layer, wherein the third aqueous gypsum slurry layer has a third slurry density of 30-55 lbs/ft3 which is lower than the second aqueous slurry density;

wherein the optional first aqueous gypsum slurry, the second aqueous gypsum slurry and the third aqueous gypsum slurry comprise a respective mixture of water and stucco, wherein the stucco comprises calcium sulfate hemihydrate, wherein the optional first aqueous gypsum slurry, the second aqueous gypsum slurry and the third aqueous gypsum slurry each comprises a respective mixture of at least 60 wt. % said calcium sulfate hemihydrate on a dry (water free) basis, and the water at a weight ratio of water to the calcium sulfate hemihydrate of 0.2:1 to 1.2:1;

passing a back second cover sheet, having third and fourth opposed surfaces, over a first transition roller spaced above the front first cover sheet, and subsequently applying the back second cover sheet over the third aqueous gypsum slurry layer, to form a multilayer assembly including the front first cover sheet, optionally the first aqueous gypsum slurry layer on the first cover sheet, the second aqueous gypsum slurry layer on the first layer, if the first layer is present, or if the first layer is not present then the second layer is on the first cover sheet, the third aqueous gypsum slurry layer on the second aqueous gypsum slurry layer, and the back second cover sheet over the third aqueous gypsum slurry layer, with the third surface of the second back cover sheet facing the third aqueous gypsum slurry layer;

passing the multilayer assembly into a forming station for forming the multilayer assembly;

setting the calcium sulfate hemihydrate respectively of the optional first aqueous gypsum slurry layer, the second aqueous gypsum slurry layer, and the third aqueous gypsum slurry layer by respectively reacting the calcium sulfate hemihydrate with the water of the optional first aqueous gypsum slurry layer, the second aqueous gypsum slurry layer, and the third aqueous gypsum slurry layer to form a panel comprising a gypsum core of an optional first board layer comprising calcium sulfate dihydrate, a second board layer comprising calcium sulfate dihydrate, and a third board layer comprising calcium sulfate dihydrate between the front first cover sheet and back second cover sheet, wherein the first board layer, if present, has a first board layer density, wherein the second board layer has a second board layer density, wherein if the first board layer is present the second board layer density is lower than the first board layer density, and wherein the third board layer has a third board layer density lower than the second board layer density; and cutting and drying the panel into the gypsum board; and wherein the method comprises:

A) said depositing of the third aqueous gypsum slurry to comprise directing the third aqueous gypsum slurry on the third surface of the back second cover sheet, passing the back second cover sheet with the third aqueous gypsum slurry over the first transition roller spaced above the first front cover sheet, while the fourth surface of the back second cover sheet contacts the first transition roller, so that a majority of the third aqueous gypsum slurry falls off the back second cover sheet onto the second aqueous gypsum slurry over the front first cover sheet; or B) said depositing of the second aqueous gypsum slurry to comprise directing the second aqueous gypsum slurry on the third surface of the back second cover sheet, passing the back second cover sheet with the second aqueous gypsum slurry over the first transition roller spaced above the front first cover sheet, while the fourth surface of the back second cover sheet contacts the first transition roller, so that a majority of the second aqueous gypsum slurry falls off the back second cover sheet onto the deposited first aqueous gypsum slurry if present or, if the first aqueous gypsum slurry is not present, onto the front first cover sheet, and then depositing the third aqueous gypsum slurry onto the deposited second aqueous gypsum slurry.

2. The method of claim 1, wherein the back second cover sheet moves along a downstream portion of a first path segment with movement along a slope defining an angle of incidence "A", relative to the first cover sheet traveling on the forming surface below the first transition roller, in a range having a minimum of 0 degrees and a maximum of 20 degrees.

3. The method of claim 1, wherein the foamed second aqueous gypsum slurry or the foamed third aqueous gypsum slurry discharges in a direction of concurrent flow with the direction of movement of the back second cover sheet to contact the third surface of the back second cover sheet in a first path segment wherein the contact is at an angle of incidence "B" in a range of 0 to 90 degrees relative to the third surface of the back second cover sheet.

4. The method of claim 1, wherein the first transition roller changes the direction of movement of the back cover sheet to movement along a first portion of a second path segment that has a second horizontal movement component in the machine direction and a second vertical movement component, the second vertical movement component being upwards, or downwards, or neutral to provide movement only along the second horizontal movement component.

5. The method of claim 1, wherein a second path segment has a first portion and a second portion, wherein at a downstream end of the first portion of the second path segment the back cover sheet passes over a second transition roller to feed the back cover sheet to the second portion of the second path segment and change the direction of movement of the back cover sheet.

6. The method of claim 5, wherein the second transition roller is at a sufficiently raised position relative to the face cover sheet moving along the forming surface for a head of slurry at the downstream end of a third path segment to be visible to an operator of the method.

7. The method of claim 1, wherein at the downstream end of a second path segment depositing the back cover sheet on the second aqueous gypsum slurry on the face cover sheet to form the multilayer assembly to include the back cover sheet on the second aqueous gypsum slurry.

8. The method of claim 1, wherein the foamed second aqueous gypsum slurry or the foamed third aqueous gypsum slurry discharges onto a portion of the back-cover sheet supported by a back-plate.

9. The method of claim 1, wherein the front first cover sheet comprises at least one of a glass mat facer sheet or a paper facer sheet.

10. The method of claim 1, wherein the lower-density region resulting from the set gypsum lower-density region slurry has a thickness of 0.2 inches to 1.0 inches.

11. The method of claim 1, wherein the middle-density region resulting from the set gypsum middle-density region slurry has a thickness of 0.05 inches to 1.0 inches.

12. The method of claim 1, wherein the higher-density region resulting from the set gypsum higher-density region slurry has a thickness of about 0.02 inches to about 0.2 inches, wherein the thickness of the lower-density region layer is greater than the thickness of the higher-density region layer, wherein the thickness of the middle-density region layer is greater than the thickness of the higher-density region layer.

13. The method of claim 1, wherein the middle density slurry and the lower-density slurry are foamed and comprise air bubbles, wherein when foamed, the gypsum lower-density region layer and the gypsum middle-density region layer resulting from the set foamed gypsum slurry have a total void volume of 10 to 92 volume percent.

14. The method of claim 13, wherein the air bubbles have an average cross-section diameter of less than 1.5 mm.

15. The method of claim 1, wherein the higher density region layer is present and has a total void volume of less than 30 volume percent.

16. The method of claim 1, further comprising adding air to the second aqueous gypsum slurry prior to depositing the second aqueous gypsum slurry, and adding air to the third aqueous slurry prior to depositing the third aqueous slurry.

17. The method of claim 1, wherein said depositing of the third aqueous gypsum slurry comprises directing the third aqueous gypsum slurry on the third surface of the back second cover sheet, passing the back second cover sheet with the third aqueous gypsum slurry over the first transition roller spaced above the first front cover sheet, while the fourth surface of the back second cover sheet contacts the first transition roller, so that a majority of the third aqueous gypsum slurry falls off the back second cover sheet onto the second aqueous gypsum slurry on the front first cover sheet.

18. The method of claim 1, wherein said depositing of the second aqueous gypsum slurry comprises directing the second aqueous gypsum slurry on the third surface of the back second cover sheet, passing the back second cover sheet with the second aqueous gypsum slurry over the first transition roller spaced above the front first cover sheet, while the fourth surface of the back second cover sheet contacts the first transition roller, so that a majority of the second aqueous gypsum slurry falls off the back second cover sheet onto the deposited first aqueous gypsum slurry if present or, if the first aqueous gypsum slurry is not present, onto the front first cover sheet, and then depositing the third aqueous gypsum slurry onto the deposited second aqueous gypsum slurry.

* * * * *